US012107211B2

(12) United States Patent
Chen et al.

(10) Patent No.: US 12,107,211 B2
(45) Date of Patent: Oct. 1, 2024

(54) ELECTROCHEMICAL CELLS INCLUDING SELECTIVELY PERMEABLE MEMBRANE AND SEMI-SOLID ELECTRODES, AND METHOD OF MANUFACTURING THE SAME

(71) Applicant: 24M Technologies, Inc., Cambridge, MA (US)

(72) Inventors: Junzheng Chen, Concord, MA (US); Naoki Ota, Lexington, MA (US); Jeffry Disko, North Brookfield, MA (US); Yuki Kusachi, Burlington, MA (US)

(73) Assignee: 24M Technologies, Inc., Cambridge, MA (US)

( * ) Notice: Subject to any disclaimer, the term of this patent is extended or adjusted under 35 U.S.C. 154(b) by 121 days.

(21) Appl. No.: 16/907,762

(22) Filed: Jun. 22, 2020

(65) Prior Publication Data
US 2020/0358129 A1 Nov. 12, 2020

Related U.S. Application Data

(63) Continuation of application No. 16/242,849, filed on Jan. 8, 2019, now Pat. No. 10,734,672.
(Continued)

(51) Int. Cl.
*H01M 10/056* (2010.01)
(52) U.S. Cl.
CPC .............. *H01M 10/056* (2013.01); *H01M 2300/0025* (2013.01); *H01M 2300/0071* (2013.01); *H01M 2300/0088* (2013.01)
(58) Field of Classification Search
CPC .................................................. H01M 10/056
(Continued)

(56) References Cited

U.S. PATENT DOCUMENTS 4,092,464 A 5/1978 Dey et al.
5,582,931 A 12/1996 Kawakami
(Continued)

FOREIGN PATENT DOCUMENTS

CN 1489229 A 4/2004
CN 102544413 A 7/2012
(Continued)

OTHER PUBLICATIONS

International Search Report and Written Opinion for International Application No. PCT/US2021/038921, mailed Nov. 29, 2021, 19 pages.
(Continued)

*Primary Examiner* — Sean P Cullen
(74) *Attorney, Agent, or Firm* — Cooley LLP

(57) ABSTRACT

Embodiments described herein relate generally to electrochemical cells including a selectively permeable membrane and systems and methods for manufacturing the same. In some embodiments, the selectively permeable membrane can include a solid-state electrolyte material. In some embodiments, electrochemical cells can include a cathode disposed on a cathode current collector, an anode disposed on an anode current collector, and the selectively permeable membrane disposed therebetween. In some embodiments, the cathode and/or anode can include a slurry of an active material and a conductive material in a liquid electrolyte. In some embodiments, a catholyte can be different from an anolyte. In some embodiments, the catholyte can be optimized to improve the redox electrochemistry of the cathode and the anolyte can be optimized to improve the redox electrochemistry of the anode. In some embodiments, the selectively permeable membrane can be configured to isolate the catholyte from the anolyte.

28 Claims, 18 Drawing Sheets

Related U.S. Application Data

(60) Provisional application No. 62/686,283, filed on Jun. 18, 2018, provisional application No. 62/662,919, filed on Apr. 26, 2018, provisional application No. 62/614,618, filed on Jan. 8, 2018.

(58) Field of Classification Search
USPC .......................................................... 429/105
See application file for complete search history.

(56) References Cited

U.S. PATENT DOCUMENTS

| | | | |
|---|---|---|---|
| 5,837,397 A | 11/1998 | Xing | |
| 6,296,967 B1 | 10/2001 | Jacobs et al. | |
| 6,503,657 B1 | 1/2003 | Takami et al. | |
| 6,803,145 B1 | 10/2004 | Von During | |
| 7,682,735 B2 | 3/2010 | Lee | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,130,198 B2 | 9/2015 | Visco et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 10,411,310 B2 | 9/2019 | Chiang et al. | |
| 10,483,582 B2 | 11/2019 | Chiang et al. | |
| 10,497,935 B2 | 12/2019 | Ota et al. | |
| 10,522,870 B2 | 12/2019 | Tan et al. | |
| 10,566,581 B2 | 2/2020 | Bazzarella et al. | |
| 10,566,603 B2 | 2/2020 | Slocum et al. | |
| 10,593,952 B2 | 3/2020 | Ota et al. | |
| 10,601,239 B2 | 3/2020 | Taylor et al. | |
| 10,637,038 B2 | 4/2020 | Zagars et al. | |
| 10,777,852 B2 | 9/2020 | Woodford et al. | |
| 10,854,869 B2 | 12/2020 | Bazzarella et al. | |
| 10,886,521 B2 | 1/2021 | Zagars et al. | |
| 10,910,858 B2 | 2/2021 | Taylor et al. | |
| 10,957,940 B2 | 3/2021 | Tan et al. | |
| 10,964,973 B2 | 3/2021 | Tan et al. | |
| 11,005,087 B2 | 5/2021 | Ota et al. | |
| 11,018,365 B2 | 5/2021 | Chiang et al. | |
| 11,024,903 B2 | 6/2021 | Ota et al. | |
| 11,094,487 B2 | 8/2021 | Lawrence et al. | |
| 11,094,976 B2 | 8/2021 | Chiang et al. | |
| 11,121,437 B2 | 9/2021 | Bazzarella et al. | |
| 11,139,467 B2 | 10/2021 | Zagars et al. | |
| 11,145,909 B2 | 10/2021 | Chiang et al. | |
| 11,309,531 B2 | 4/2022 | Slocum et al. | |
| 11,342,567 B2 | 5/2022 | Chiang et al. | |
| 11,394,049 B2 | 7/2022 | Tan et al. | |
| 11,462,722 B2 | 10/2022 | Aranami et al. | |
| 11,469,065 B2 | 10/2022 | Lawrence et al. | |
| 11,476,551 B2 | 10/2022 | Tyler et al. | |
| 11,575,146 B2 | 2/2023 | Taylor et al. | |
| 11,611,061 B2 | 3/2023 | Zagars et al. | |
| 11,631,920 B2 | 4/2023 | Bazzarella et al. | |
| 11,646,437 B2 | 5/2023 | Bazzarella et al. | |
| 11,652,203 B2 | 5/2023 | Zagars et al. | |
| 11,749,804 B2 | 9/2023 | Chen et al. | |
| 11,757,129 B2 | 9/2023 | Tan et al. | |
| 2004/0264110 A1 | 12/2004 | Michel et al. | |
| 2006/0057433 A1 | 3/2006 | Ando et al. | |
| 2007/0020524 A1 | 1/2007 | Kim et al. | |
| 2008/0050644 A1* | 2/2008 | Christensen | H01M 6/5005 |
| | | | 429/188 |
| 2008/0268327 A1 | 10/2008 | Gordon et al. | |
| 2010/0047671 A1 | 2/2010 | Chiang et al. | |
| 2010/0323264 A1 | 12/2010 | Chiang et al. | |
| 2011/0129722 A1 | 6/2011 | Yoneda | |
| 2011/0157771 A1* | 6/2011 | Gibson | H01G 9/02 |
| | | | 361/500 |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0058378 A1 | 3/2012 | Lee et al. | |
| 2012/0164499 A1 | 6/2012 | Chiang et al. | |
| 2012/0164513 A1 | 6/2012 | Peng et al. | |
| 2012/0177998 A1 | 7/2012 | Ogawa et al. | |
| 2012/0315537 A1 | 12/2012 | Ravdel et al. | |
| 2013/0000110 A1 | 1/2013 | Takeda et al. | |
| 2013/0029205 A1 | 1/2013 | Adams et al. | |
| 2013/0029206 A1 | 1/2013 | Lev | |
| 2013/0055559 A1 | 3/2013 | Slocum et al. | |
| 2013/0065122 A1 | 3/2013 | Chiang et al. | |
| 2013/0183546 A1* | 7/2013 | Joshi | H01M 6/185 |
| | | | 204/252 |
| 2013/0236766 A1 | 9/2013 | Seo et al. | |
| 2013/0244082 A1 | 9/2013 | Lee et al. | |
| 2013/0309547 A1* | 11/2013 | Bazzarella | H01M 10/0436 |
| | | | 429/136 |
| 2013/0337319 A1 | 12/2013 | Doherty et al. | |
| 2013/0344367 A1 | 12/2013 | Chiang et al. | |
| 2014/0004437 A1 | 1/2014 | Slocum et al. | |
| 2014/0008006 A1 | 1/2014 | Lee et al. | |
| 2014/0030623 A1 | 1/2014 | Chiang et al. | |
| 2014/0039710 A1 | 2/2014 | Carter et al. | |
| 2014/0079992 A1 | 3/2014 | Tanaka | |
| 2014/0131630 A1 | 5/2014 | Hwang et al. | |
| 2014/0154546 A1 | 6/2014 | Carter et al. | |
| 2014/0154565 A1 | 6/2014 | Ku et al. | |
| 2014/0170524 A1 | 6/2014 | Chiang et al. | |
| 2014/0199577 A1 | 7/2014 | Bhavaraju | |
| 2014/0248521 A1 | 9/2014 | Chiang et al. | |
| 2014/0272547 A1 | 9/2014 | Ramasubramanian et al. | |
| 2014/0315097 A1 | 10/2014 | Tan et al. | |
| 2014/0356654 A1 | 12/2014 | Bhavaraju | |
| 2014/0356736 A1 | 12/2014 | Choi et al. | |
| 2014/0363721 A1 | 12/2014 | Bhola et al. | |
| 2015/0024279 A1 | 1/2015 | Tan et al. | |
| 2015/0027615 A1 | 1/2015 | Singh et al. | |
| 2015/0129081 A1 | 5/2015 | Chiang et al. | |
| 2015/0140371 A1 | 5/2015 | Slocum et al. | |
| 2015/0155592 A1* | 6/2015 | Pratt | H01M 4/485 |
| | | | 429/315 |
| 2015/0155596 A1 | 6/2015 | Gardner | |
| 2015/0171406 A1 | 6/2015 | Bazzarella et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0026543 A1 | 1/2016 | Tian | |
| 2016/0036107 A1 | 2/2016 | Takechi et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1* | 5/2016 | Ota | H01M 10/0525 |
| | | | 429/231.95 |
| 2016/0133916 A1 | 5/2016 | Zagars et al. | |
| 2016/0181606 A1* | 6/2016 | Suga | H01M 10/0525 |
| | | | 429/223 |
| 2016/0190544 A1 | 6/2016 | Slocum et al. | |
| 2016/0218375 A1 | 7/2016 | Chiang et al. | |

(56) References Cited

U.S. PATENT DOCUMENTS

| | | |
|---|---|---|
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0005367 A1 | 1/2017 | Van Berkel et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0214084 A1 | 7/2017 | Cheng et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2017/0338522 A1 | 11/2017 | Hu et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319239 A1 | 10/2019 | Zhou et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0028178 A1 | 1/2020 | He et al. |
| 2020/0044296 A1 | 2/2020 | Chiang et al. |
| 2020/0067075 A1 | 2/2020 | Choi et al. |
| 2020/0106094 A1 | 4/2020 | Ota et al. |
| 2020/0161688 A1 | 5/2020 | Chaing et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |

FOREIGN PATENT DOCUMENTS

| | | | | |
|---|---|---|---|---|
| CN | 102576909 A | 7/2012 | | |
| CN | 102646801 A | 8/2012 | | |
| CN | 103493253 A | 1/2014 | | |
| CN | 103746089 A | 4/2014 | | |
| CN | 104269508 A | 1/2015 | | |
| CN | 104538577 A | 4/2015 | | |
| CN | 106159312 A | 11/2016 | | |
| CN | 106207060 A | * 12/2016 | ......... | H01M 50/403 |
| CN | 107069148 A | 8/2017 | | |
| CN | 107112594 A | 8/2017 | | |
| CN | 107346833 A | * 11/2017 | ........ | H01M 10/0525 |
| CN | 107492681 A | * 12/2017 | | |
| CN | 206849967 U | 1/2018 | | |
| CN | 108598563 A | * 9/2018 | ........ | H01M 10/0525 |
| CN | 111384404 A | 7/2020 | | |
| EP | 0602976 A1 | 6/1994 | | |
| EP | 3386008 B1 | 4/2020 | | |
| JP | H06187998 A | 7/1994 | | |
| JP | 2003123832 A | 4/2003 | | |
| JP | 2005071658 A | 3/2005 | | |
| JP | 2010157510 A | 7/2010 | | |
| JP | 2011-081931 A | 4/2011 | | |
| JP | 2013145649 A | 7/2013 | | |
| KR | 20140039022 A | 3/2014 | | |
| KR | 20140144870 A | 12/2014 | | |
| KR | 2020-0000334 A | 1/2020 | | |
| KR | 2020-0000334 B1 | 1/2020 | | |
| KR | 102111310 B1 | 5/2020 | | |
| WO | WO-8500248 A1 | 1/1985 | | |
| WO | WO-2004027901 A2 | 4/2004 | | |
| WO | WO-2012077707 A1 | 6/2012 | | |
| WO | WO 2018/084431 A1 | 5/2018 | | |
| WO | WO 2018/084431 B1 | 5/2018 | | |
| WO | WO-2022094466 A1 | 5/2022 | | |
| WO | WO-2022212404 A1 | 10/2022 | | |

OTHER PUBLICATIONS

Partial International Search Report for International Application No. PCT/US2021/057727, mailed Feb. 25, 2022, 4 pages.

Hatzell et al., "Materials for suspension (semi-solid) electrodes for energy and water technologies", Chemical Society Reviews, vol. 44, No. 23, Sep. 28, 2015, pp. 8664-8687, XP055459247.

Extended European Search Report for European Application No. 19735808.8, mailed Sep. 13, 2021, 8 pages.

Office Action for U.S. Appl. No. 16/242,849, mailed Oct. 2, 2019, 21 pages.

Office Action for U.S. Appl. No. 16/242,849, mailed Feb. 10, 2020, 20 pages.

International Search Report and Written Opinion for International Application No. PCT/US2019/012750, mailed May 16, 2019, 12 pages.

Dolle, J., "Investigation of Si/C-based anodes for Li-Ion batteries," Berlin, 2014, 116 pages.

International Search Report and Written Opinion for International Application No. PCT/US2021/057727, dated Apr. 19, 2022, 24 pages.

Invitation to Pay Additional Fees for International Application No. PCT/US2021/057727 dated Feb. 25, 2022, 20 pages.

Search Report for Chinese Application CN201980012824.1, mailed Aug. 3, 2022, 29 pages.

Final Office Action for U.S. Appl. No. 16/913,734, Jul. 18, 2022, 17 pages.

International Preliminary Report on Patentability for International Application No. PCT/US2021/038921 dated Jan. 5, 2023, 14 pages.

International Preliminary Report on Patentability for International Application No. PCT/US2021/057727 dated May 11, 2023, 18 pages.

(56) References Cited

OTHER PUBLICATIONS

Non-Final Office Action for U.S. Appl. No. 16/913,734 dated Jan. 13, 2022, 16 pages.
Non-Final Office Action for U.S. Appl. No. 16/913,734 dated Oct. 18, 2021, 6 pages.
Notice of Allowance for U.S. Appl. No. 16/913,734, mailed Dec. 12, 2022, 8 pages.
Office Action for Chinese Application No. CN201980012824 dated Feb. 23, 2023, 16 pages.
International Search Report and Written Opinion for International Application No. PCT/US2022/022382, mailed Jul. 18, 2022, 14 pages.
Rejection Decision for Chinese Application No. 20198012824 dated Jun. 10, 2023, 11 pages.
Sethuraman, V. A. et al., "In situ measurements of stress evolution in silicon thin films during electrochemical lithiation and delithiation," Journal of Power Sources, vol. 195, No. 15, Aug. 2010, pp. 5062-5066.

* cited by examiner

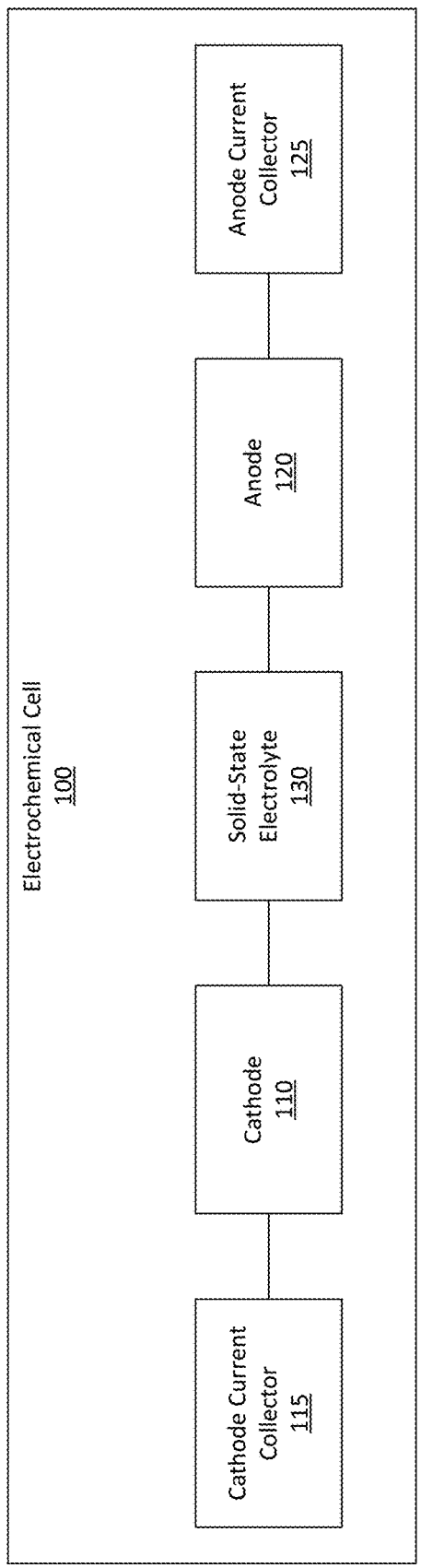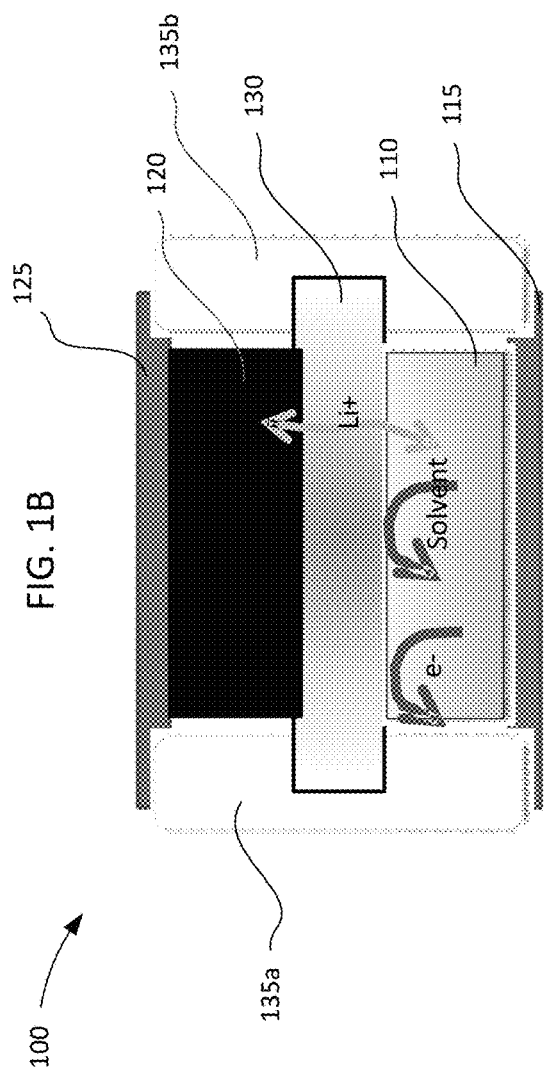

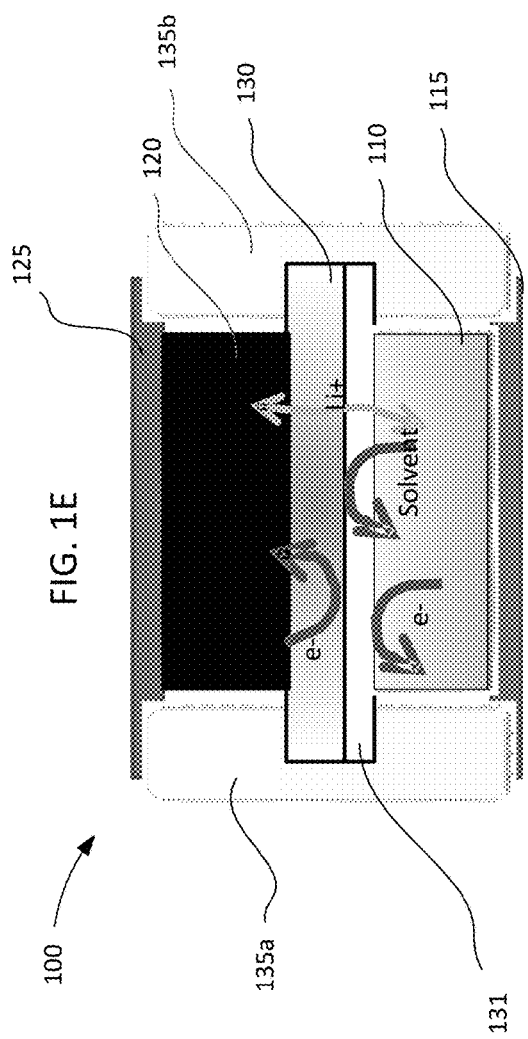
FIG. 1E
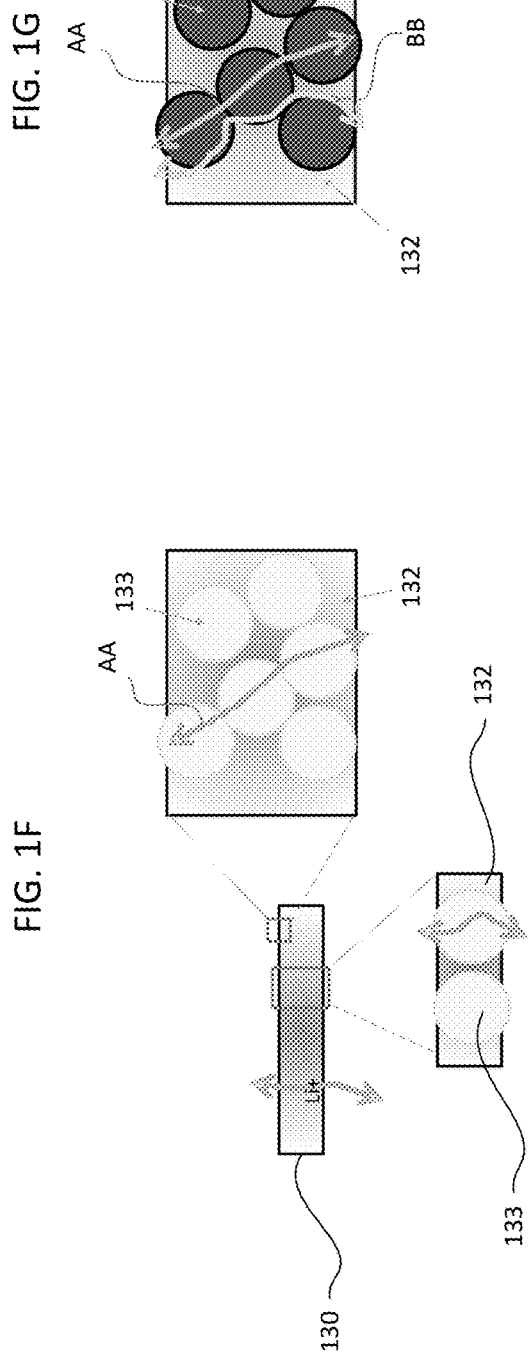
FIG. 1F
FIG. 1G

Dispense an anode material onto an anode current collector to form an anode
21

↓

Dispose a sealing material onto the anode
22

↓

Dispose a selectively permeable membrane onto the sealing material positioned on the anode
23

↓

Apply heat and/or pressure to form a seal between selectively permeable membrane and anode current collector
24

↓

Dispose a cathode including cathode material and cathode current collector onto the selectively permeable
25

↓

Dispose the electrochemical cell into a pouch
26

↓

Seal the pouch to form the finished electrochemical cell
27

ELECTROCHEMICAL CELLS INCLUDING SELECTIVELY PERMEABLE MEMBRANE AND SEMI-SOLID ELECTRODES, AND METHOD OF MANUFACTURING THE SAME

CROSS-REFERENCE TO RELATED APPLICATIONS

This application is a continuation of U.S. patent application Ser. No. 16/242,849, entitled "ELECTROCHEMICAL CELLS INCLUDING SELECTIVELY PERMEABLE MEMBRANES, SYSTEMS AND METHODS OF MANUFACTURING THE SAME, and filed Jan. 8, 2019, which claims the priority to and the benefit of U.S. Provisional Application No. 62/614,618, entitled "HYBRID SEMI-SOLID/ALL SOLID-STATE ELECTRODES AND BATTERY STACKS" and filed on Jan. 8, 2018; U.S. Provisional Application No. 62/662,919, entitled "ELECTROCHEMICAL CELLS INCLUDING SELECTIVELY PERMEABLE MEMBRANES, SYSTEMS AND METHODS OF MANUFACTURING THE SAME" and filed on Apr. 26, 2018; and U.S. Provisional Application No. 62/686,283, entitled "ELECTROCHEMICAL CELLS INCLUDING SELECTIVELY PERMEABLE MEMBRANES, SYSTEMS AND METHODS OF MANUFACTURING THE SAME" and filed on Jun. 18, 2018; the disclosure of each which is hereby incorporated by reference in their entirety.

BACKGROUND

Embodiments described herein relate generally to electrochemical cells having selectively permeable membranes and systems and methods for manufacturing the same. Batteries are typically constructed of solid electrodes, separators, electrolyte, and ancillary components such as, for example, packaging, thermal management, cell balancing, consolidation of electrical current carriers into terminals, and/or other such components. The electrodes typically include active materials, conductive materials, binders and other additives.

Some known methods for preparing batteries include coating a metallic substrate (e.g., a current collector) with slurry composed of an active material, a conductive additive, and a binding agent dissolved or dispersed in a solvent or water, evaporating the solvent or water, and calendering the dried solid matrix to a specified thickness. The electrodes are then cut, packaged with other components, infiltrated with electrolyte and the entire package is then sealed.

Such known methods generally involve complicated and expensive manufacturing steps such as casting the electrode. These known methods for producing electrodes result in batteries with lower capacity, lower energy density and a high ratio of inactive components to active materials. Furthermore, the binders used in known electrode formulations can increase tortuosity and decrease the ionic conductivity of the electrode.

SUMMARY

Embodiments described herein relate generally to electrochemical cells including a selectively permeable membrane and systems and methods for manufacturing the same. In some embodiments, the selectively permeable membrane can include a solid-state electrolyte material. In some embodiments, electrochemical cells can include a cathode disposed on a cathode current collector, an anode disposed on an anode current collector, and the selectively permeable membrane disposed therebetween. In some embodiments, the cathode and/or anode can include a slurry of an active material and a conductive material in a liquid electrolyte. In some embodiments, a catholyte can be different from an anolyte. In some embodiments, the catholyte can be optimized to improve the redox electrochemistry of the cathode and the anolyte can be optimized to improve the redox electrochemistry of the anode. In some embodiments, the selectively permeable membrane can be configured to isolate the catholyte from the anolyte.

In some embodiments, the electrochemical cell includes an anode including anode current collector, anode material, and an anolyte; a cathode including cathode current collector, cathode material, and an catholyte; and a selectively permeable membrane disposed between the anode and the cathode, the selectively permeable membrane configured to chemically and/or fluidically isolate the anode from the cathode.

In some embodiments, the electrochemical cell includes an anode including anode current collector and a semi-solid anode material including an anolyte; a cathode current collector; a first cathode including a semi-solid cathode material having a catholyte, the first cathode disposed on the cathode current collector; a second cathode disposed on the first cathode, the second cathode including an active material, a binder, solid-state electrolyte material, and being configured to chemically and/or fluidically isolate the anode from the cathode; and a conventional separator configured to provide electrical isolation between the anode and the cathode.

In some embodiments, a method of forming an electrochemical cell includes dispensing a semi-solid cathode slurry onto a cathode current collector to form a cathode; dispensing an anode material onto an anode current collector to form an anode; disposing a selectively permeable membrane onto at least one of the cathode and the anode, the selectively permeable membrane is configured to chemically and/or fluidically isolate the cathode including a catholyte from the anode including an anolyte; and disposing the cathode onto the anode with the selectively permeable membrane therebetween to form an electrochemical cell.

In some embodiments, a method of forming an electrochemical cell includes dispensing a semi-solid anode material including an anolyte onto an anode current collector to form an anode; dispensing a semi-solid cathode slurry including an catholyte onto a cathode current collector to form a cathode; disposing a second cathode on the semi-solid cathode, the second cathode including an active material, a binder, solid-state electrolyte material, and being configured to chemically and/or fluidically isolate the anode from the cathode; disposing a selectively permeable membrane onto at least one of the cathode and the anode, the selectively permeable membrane is configured to chemically and/or fluidically isolate the cathode including the catholyte from the anode including the anolyte; and disposing a conventional separator onto the selectively permeable membrane, the conventional separator configured to provide electrical isolation between the anode and the cathode.

In some embodiments, a method of forming an electrochemical cell includes dispensing an anode material onto an anode current collector to form an anode; disposing a sealing material onto the anode; disposing a selectively permeable membrane onto the sealing material positioned on the anode, the selectively permeable membrane is configured to chemically and/or fluidically isolate the cathode including a catholyte from the anode including an anolyte; applying heat and/or pressure to form a seal between semi-permeable membrane and anode current collector; and disposing the cathode onto the anode with the selectively permeable membrane therebetween to form an electrochemical cell.

BRIEF DESCRIPTION OF THE DRAWINGS

FIG. 1A is a schematic illustration of an electrochemical cell, according to an embodiment.

FIG. 1B is a schematic illustration of an electrochemical cell, according to an embodiment.

FIG. 1E is a schematic illustration of an electrochemical cell, according to an embodiment.

FIG. 1F is a schematic illustration of a portion of an selectively permeable membrane, according to an embodiment.

FIG. 1G is a schematic illustration of a portion of an selectively permeable membrane, according to an embodiment.

FIG. 9 illustrates a method for manufacturing an electrochemical cell, according to an embodiment.

DETAILED DESCRIPTION

Figure 1C:
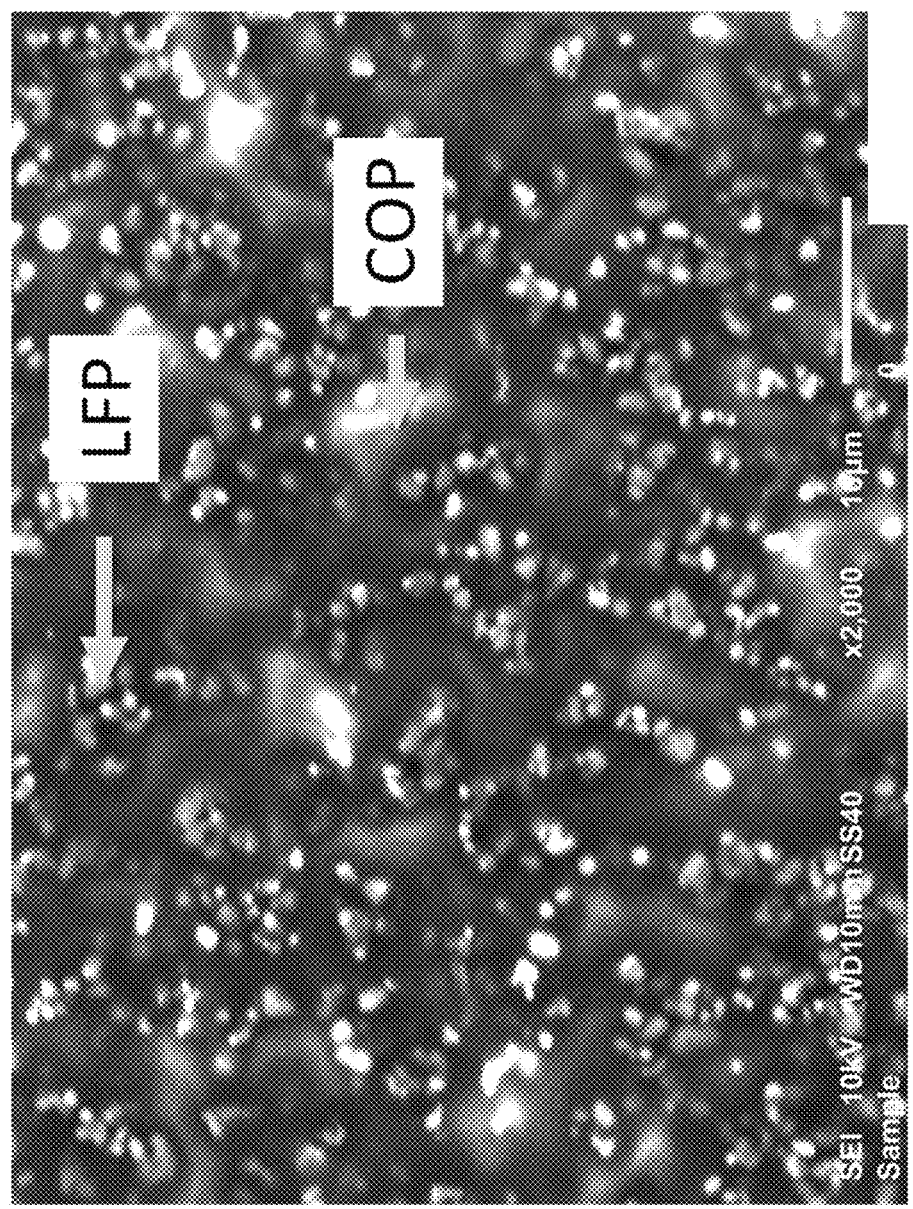
FIG. 1C is a scanning electron microscope image of a cathode composite film, according to an embodiment.

Embodiments described herein relate generally to electrochemical cells including a selectively permeable membrane and systems and methods for manufacturing the same. Embodiments described herein relate generally to electrochemical cells including a cathode disposed on a cathode current collector, an anode disposed on an anode current collector, and the selectively permeable membrane disposed therebetween. In some embodiments, the cathode can include a slurry of an active material and a conductive material in a liquid catholyte. In some embodiments, the anode can include a slurry of an active material and a conductive material in a liquid anolyte. In some embodiments, the catholyte and the anolyte can be different. In some embodiments, the catholyte can be optimized to improve the performance of the redox electrochemistry and/or safety of the cathode and the anolyte can be optimized to improve the performance of the redox electrochemistry and/or safety of the anode. In some embodiments, the selectively permeable membrane can be configured to isolate the catholyte from the anolyte. In some embodiments, the selectively permeable membrane can be disposed between the cathode and the anode. In some embodiments, the selectively permeable membrane can extend substantially beyond the cathode and the anode. In some embodiments, a portion of the selectively permeable membrane can be sealed between a first portion of a pouch material and a second portion of the pouch material to fluidically isolate the cathode from the anode. In some embodiments, a portion of the selectively permeable membrane can be sealed a current collector to fluidically isolate the cathode from the anode. In some embodiments, a portion of the selectively permeable membrane can be sealed the cathode current collector to fluidically isolate the cathode from the anode.

Conventional battery systems store electrochemical energy by separating an ion source and ion sink at differing ion electrochemical potential. A difference in electrochemical potential produces a voltage difference between the positive and negative electrodes, which produces an electric current if the electrodes are connected by a conductive element. Differences in electrochemical potential between the positive and negative electrodes may produce a higher voltage system, which contributes to higher energy density cells. In a conventional battery system, negative electrodes and positive electrodes are connected via a parallel configuration of two conductive elements. The external elements exclusively conduct electrons, however, the internal elements, being separated by a separator and electrolyte, exclusively conduct ions. The external and internal flow streams supply ions and electrons at the same rate, as a charge imbalance cannot be sustained between the negative electrode and positive electrode. The produced electric current can be used to drive an external device. A rechargeable battery can be recharged by application of an opposing voltage difference that drives electric and ionic current in an opposite direction as that of a discharging battery. Accordingly, active material of a rechargeable battery requires the ability to accept and provide ions. Increased electrochemical potentials produce larger voltage differences between the cathode and anode of a battery, which increases the electrochemically stored energy per unit mass of the battery. For high-power batteries, the ionic sources and sinks are connected to a separator by an element with large ionic conductivity, and to the current collectors with high electric conductivity elements.

Typical battery manufacturing involves numerous complex and costly processes carried out in series, each of which is subject to yield losses, incurs capital costs for equipment, and includes operating expenses for energy consumption and consumable materials. The process first involves making separate anodic and cathodic mixtures that are typically mixtures of electrochemically active ion storage compounds, electrically conductive additives, and polymer binders. The mixtures are coated onto the surfaces of flexible metal foils and subsequently compressed under high pressure to increase density and control thickness. These compressed electrode/foil composites are then slit into sizes and/or shapes that are appropriate for the particular form factor of the manufactured battery. The slit electrode composites are typically co-wound or co-stacked with intervening ionically-conductive/electronically-insulating separator membranes to construct battery windings, i.e. "jelly rolls" or "stacks," which are then packaged in metal cans, flexible polymer pouches, etc. The resulting cells can be infiltrated with liquid electrolyte that need be introduced in a carefully controlled environment, e.g., a high vacuum environment.

The stored energy or charge capacity of a manufactured battery is related to the inherent charge capacity of the active materials (mAh/g), the volume of the electrodes (cm$^3$), the product of the thickness, area, and number of layers, and the loading of active material in the electrode media (e.g., grams of active material/cubic centimeters of electrode media. Therefore, to enhance commercial appeal (e.g., increased energy density and decreased cost), it is generally desirable to increase areal charge capacity (mAh/cm$^2$) of the electrodes that are to be disposed in a given battery form factor, which depends on electrode thickness and active material loading. Moreover, it is desirable to increase electrical conduction between the current collector and the electrode material. For example, it can be desirable to increase the surface area of the current collector that is in physical and/or electrical connection with a semi-solid electrode material.

Conventional electrochemical cells typically include a porous membrane separator, e.g., a porous polyolefin membrane. Conventional separators typically have thicknesses from about 6 to about 32 µm with a weight of about 5 to about 20 g/m$^2$, and a porosity of between about 38% and about 55%. Conventional separators are configured to allow for the transfer of ionic charge carriers between the cathode and the anode, and are typically configured to be wetted by the electrolyte and/or communicate the electrolyte between the anode side and the cathode side. Conventional separators provide electrical isolation between the anode and the cathode. Therefore, a single electrolyte is typically used for both the anode side and the cathode side of conventional electrochemical cells that is compatible with the anode, cathode, and current collector materials. In other words, for conventional electrochemical cells, a common electrolyte is chosen that is not optimized for either cathode electrochemistry or for anode electrochemistry. The fluidic communication of the electrolyte across conventional separators can lead to the chemical homogenization of electrolyte between the cathode and the anode, which limits the ability to tailor the catholyte and the anolyte materials for optimal electrochemical performance in the cathode and the anode, respectively.

Traditional solid electrodes are often made by sintering or pressing fully solid electrolytes and active material powders, however the resulting electrodes typically do not have good interfacial contact between the electrolyte and the active material due to volumetric changes during battery operation. For traditional solid-state electrodes, a full mixture of the selectively permeable membrane and active materials still cannot achieve optimal electrochemical contact. In addition, cracks often form in solid electrolytes during battery operation, e.g., due to temperature and/or volume changes. Therefore, one important barrier to solid electrolyte commercialization has been the interfacial contact resistance. In other words, a selectively permeable membrane and/or solid-state electrode can be highly resistant to remaining in contact with another selectively permeable membrane/electrode due to chemical or physical interactions.

Traditional electrochemical cells also often use highly volatile and highly flammable solvents as part of the liquid electrolyte, which can increase the rate of solvent leaks, fire, and other electrochemical cell damage. Traditional solvent electrolytes, for example for lithium-ion batteries, often include a lithium-containing salt in solvents such as dimethyl carbonate, ethyl methyl carbonate, and/or diethyl carbonate. These solvents and salt combinations often lead to lithium dendrite formation, gas formation, and/or solid-electrolyte interphase (SEI) formation, which can lead to decreased energy density, decreased conductivity and rate capability, decreased cycle and calendar life, and/or explosion and fire risk. In order to stabilize the SEI layer and reduce reactivity, an electrolyte additive such as vinyl carbonate (VC) may be used, however these additives are typically compatible on the anode side but unstable on the cathode side.

Thus, a need exists for an electrochemical cell having a selectively permeable membrane that can chemically and/or fluidically isolate the anode from the cathode while facilitating ion transfer during charge and discharge of the cell. A need also exists for a method of manufacturing an electrochemical cell having a selectively permeable membrane disposed between the anode and the cathode. In some embodiments, the electrochemical cells described herein can include a semi-solid cathode and/or a semi-solid anode.

In some embodiments, the semi-solid electrodes described herein can be binderless and/or can use less binder than is typically used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. Since the semi-solid electrodes described herein, can be made substantially thicker than conventional electrodes, the ratio of active materials (i.e., the semi-solid cathode and/or anode) to inactive materials (i.e., the current collector and/or separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein.

The semi-solid electrodes described herein can be formulated as a slurry such that the electrolyte is included in the slurry formulation. This is in contrast to conventional electrodes, for example calendered electrodes, where the electrolyte is generally added to the electrochemical cell once the electrochemical cell has been disposed in a container, for example, a pouch or a can.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles can be co-suspended in an electrolyte to produce a semi-solid electrode.

Examples of systems and methods that can be used for preparing the semi-solid compositions and/or electrodes are described in U.S. Pat. No. 9,484,569 (hereafter "the '569 Patent"), filed Mar. 15, 2013, entitled "Electrochemical Slurry Compositions and Methods for Preparing the Same," and U.S. Patent Publication No. 2016/0133916 (hereafter "the '916 Publication"), filed Nov. 4, 2015, entitled "Electrochemical Cells Having Semi-Solid Electrodes and Methods of Manufacturing the Same", the entire disclosures of which are hereby incorporated by reference herein.

In some embodiments, electrode materials described herein can be conventional electrode materials for the anode (e.g., including lithium metal) and a semi-solid composition for the cathode. In some embodiments, electrode materials described herein can be conventional electrode materials for the cathode and a semi-solid composition for the anode. In some embodiments, the electrochemical cell can include a selectively permeable membrane capable of blocking crossover of electrolyte (e.g., solvent) molecules between the cathode side and the anode side. In some embodiments, a carbon-containing anode can be used with an anolyte (e.g., lithium hexafluorophosphate) with solvents (e.g., ethylene carbonate) such that a solid-electrolyte interphase is formed. In some embodiments, the selectively permeable membrane can be ion-permeable but impermeable to the catholyte and anolyte. In some embodiments, the selectively permeable membrane can extend substantially past at least one of the cathode materials and the anode materials to chemically and/or fluidically isolate the cathode side from the anode side of the electrochemical cell. In some embodiments, the selectively permeable membrane can extend beyond both the cathode and the anode and respective current collectors to chemically and/or fluidically isolate the cathode side from the anode side of the electrochemical cell. In some embodiments, the four edges of the selectively permeable membrane can extend beyond both the cathode material and the anode material and the respective current collectors. In some embodiments, the four edges of the selectively permeable membrane can be sealed between two surfaces of a pouch material to chemically and/or fluidically isolate the cathode side from the anode side of the electrochemical cell. In some embodiments, the four edges of the selectively permeable membrane can be sealed to a current collector to fluidically isolate the cathode from the anode. In some embodiments, the four edges of the selectively permeable membrane can be sealed to the cathode current collector to fluidically isolate the cathode from the anode. In some embodiments, the cathode is a semi-solid electrode that is sealed in between the cathode current collector and the selectively permeable membrane.

Use of the selectively permeable membrane as described herein may result in increased safety and reduced leak potential for electrochemical cells. For instance, in some embodiments, the electrochemical cells described herein may have reduced gas production during formation of the battery and during the initial charge-discharge cycles. In some embodiments, the electrochemical cells described herein can include a non-flammable solvent or a non-corrosive or high oxidation resistance electrolyte salt. In addition, in some embodiments, the electrochemical cells described herein may experience reduced solvent electrolyte leakage due to the use of semi-solid electrode materials and selectively permeable membranes.

In addition, the manufacturing and formation processes may be improved by reducing or eliminating the need for an electrolyte addition step and/or a degassing step. In typical battery assembly steps, the formed electrochemical cell is disposed within a pouch material and an electrolyte is injected into the cell. Alternatively, the electrochemical cells described herein can use semi-solid electrode materials including the electrolyte and a selectively permeable membrane coupled to at least one of the anode and the cathode. In typical battery formation steps, the battery is sealed inside the pouch, the cell undergoes a number of charge-discharge cycles to form the SEI layer and ensure the battery is working properly, and then gas formed during these initial cycles is released by puncturing the pouch. These and other manufacturing steps can be eliminated from the manufacturing process by using semi-solid electrode material and the selectively permeable membrane rather than conventional electrodes infused with a liquid electrolyte.

Use of the selectively permeable membrane as described herein may also eliminate the need for a conventional ion-permeable membrane separator as used in conventional electrochemical cells. Thus, the elimination of a conventional separator in the electrochemical cells described herein may eliminate additional manufacturing steps related to the manufacturing and assembly of the conventional separator.

Use of the selectively permeable membrane as described herein may also provide that a catholyte can be different from an anolyte. In other words, the composition of the catholyte can include catholyte additives, solvents, and salt selected such that the electrochemistry of the cathode is optimized without regard for the compatibility of the catholyte with the anolyte, anode, and anode current collector. Similarly, the composition of the anolyte can include anolyte additives, solvents, and salt selected such that the electrochemistry of the anode is optimized without regard for the compatibility of the anolyte/anolyte additives with the catholyte, cathode, and cathode current collector. This may result in a wider array of electrolyte materials being available for use as the catholyte and/or the anolyte. In some embodiments, the ability to use a wider array of electrolyte materials in the semi-solid electrode materials and/or the selectively permeable membrane may lead to better charging and discharging performance because cathode performance can be optimized independently of the optimization of anode performance.

Use of the selectively permeable membrane as described herein may also provide reduced contact resistance as compared to conventional solid-state electrochemical cells. Electrical contact resistance can occur at the interface of electrodes and current-collectors in electrochemical cells. Use of the selectively permeable membrane can provide reduced contact resistance by allowing the use of catholytes and anolytes that are selected for improved conductivity and chemical compatibility.

Definitions

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about" and "approximately" generally mean plus or minus 10% of the value stated, e.g., about 250 µm would include 225 µm to 275 µm, about 1,000 µm would include 900 µm to 1,100 µm.

As used herein, the term "semi-solid" refers to a material that is a mixture of liquid and solid phases, for example, such as a particle suspension, a slurry, a colloidal suspension, an emulsion, a gel, or a micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

"Conventional separator" means an ion permeable membrane, film, or layer that provides electrical isolation between an anode and a cathode, while allowing charge carrying ions to pass therethrough. Conventional separators do not provide chemical and/or fluidic isolation of the anode and cathode.

FIGS. 1A and 1B show a schematic illustration of an electrochemical cell 100 that includes a cathode 110 disposed on a cathode current collector 115, an anode 120 disposed on an anode current collector 125, and a selectively permeable membrane 130 disposed therebetween. FIG. 1B shows frame members 135a and 135b disposed around the selectively permeable membrane 130. In some embodiments, frame members 135a and 135b form a unitary structure around the perimeter of the selectively permeable membrane 130, and in other embodiments, frame members 135a and 135b form a multi-member frame. In some embodiments, frame members 135a and 135b support the selectively permeable membrane 130. In some embodiments, frame members 135a and 135b form a portion of a seal for the electrochemical cell 100. In some embodiments, the cathode 110 can include a slurry of an active material and a conductive material in a liquid catholyte. In some embodiments, the anode 120 can include a slurry of an active material and a conductive material in a liquid anolyte. In some embodiments, the catholyte can be different from the anolyte. In some embodiments, the catholyte can be optimized to improve the electrical performance of the redox electrochemistry of the cathode 110 and the anolyte can be optimized to improve the electrical performance of the redox electrochemistry of the anode 120. In some embodiments, the selectively permeable membrane 130 can be configured to isolate the catholyte chemically and/or fluidically from the anolyte. In some embodiments, use of the selectively permeable membrane 130 means the electrochemical cell 100 can be formed without a conventional ion-permeable membrane separator. In some embodiments, the selectively permeable membrane 130 does not provide electrical isolation between the cathode 110 and the anode 120 with the electrochemical cell 100. In some embodiments, the selectively permeable membrane 130 can be disposed between the cathode 110 and the anode 120. In some embodiments, the selectively permeable membrane 130 can extend substantially beyond the cathode 110 and the anode 120. In some embodiments, the edges of the selectively permeable membrane 130 can be sealed between a first portion and a second portion of a pouch material to enclose the electrochemical cell 100 within a pouch.

In some embodiments, the catholyte can be a fluorinated carbonate including, but not limited to fluoroethylene carbonate (FEC), fluorinated linear carbonate or fluorinated ethyl methyl carbonate (F-EMC), and fluorinated cyclic carbonate (F-AEC), ethylene carbonate less or a propylene carbonate (PC) rich carbonate based solvent with a lithium salt. In some embodiments, the catholyte can be a nitrile based solvent system, for example, acetonitrile with LiFSI/LiPF$_6$. In some embodiments, the catholyte can be a sulfone based solvent system, for example, sulfolane (SL) or dimethyl sulfoxide (DMSO) or similar structure solvent that have a high oxidation potentials and lithium salt. In some embodiments, the catholyte can be water with high concentration LiTFSI, LiOTf, or LiFSI. In some embodiments, the catholyte can be a non-flammable tris(2,2,2-trifluoroethyl) phosphate (TFEP) similar phosphate/phosphite based solvent with lithium salt. In some embodiments, the catholyte includes at least one of water, fluorine, PS, PES, a LiPF$_6$ salt or a LiBF$_4$ salt.

In some embodiments, the anolyte can be a glyme, for example dimethoxyethane (DME), dioxolane (DOL), Tetraethylene glycol dimethyl ether (TEGDME) with LiNO$_3$ and/or LiTFSI for use in lithium batteries. In some embodiments, the anolyte can be a LiTFSI based carbonate electrolyte for graphite/lithium at high concentrations. In some embodiments, the anolyte can be a LiBOB/LiODFB based carbonate/glyme electrolyte for a graphite or lithium system. In some embodiments, the anolyte can be a high concentration FEC electrolyte for silicon systems. In some embodiments, the anolyte can be a carbonate electrolyte for use with graphite systems. In some embodiments, the anolyte includes at least one of 1,2-dimethoxyethane, N-methylpyrrolidone, LiBOP, LiDFOB, and/or VC. In some embodiments, the anolyte includes at least one of a LiFSI salt or a LiTFSI salt.

In some embodiments, the selectively permeable membrane 130 can be made by coating solid-state electrolyte material onto a separator, e.g., using a vapor deposition process, a cold spray process, a plasma deposition process, electrochemical deposition, and/or a sol-gel process. In some embodiments, the solid-state electrolyte material coating layer can have 0% to about 20% porosity. In some embodiments, the solid-state electrolyte material coating layer can have 0% to about 30% porosity, about 1% to about 29%, about 1% to about 28%, about 1% to about 27%, about 1% to about 26%, about 1% to about 25%, about 1% to about 24%, about 1% to about 23%, about 1% to about 22%, about 1% to about 21%, about 1% to about 20%, or less than about 20% porosity, inclusive of all values and ranges therebetween.

In some embodiments, the selectively permeable membrane 130 can be made by coating solid-state powders with polymer binders onto a separator, e.g., using a liquid coating process or extrusion process with or without a hot/cold press process. In some embodiments, the separator can include a ceramic material. In some embodiments, the solid-state electrolyte material coating layer with polymer can have 0% to about 20% porosity. In some embodiments, the separator can include a ceramic material and can be hot pressed to reduce the porosity of the coating layer. In some embodiments, the polymeric binder can include at least one of polyvinylidene difluoride (PVDF) or other fluorinated polymer or polyethylene terephthalate (PET) or poly phenylene sulfide (PPS) or poly ether-ether ketone (PEEK) or polyimide (PI) or polyvinyl chloride (PVC) or styrene butadiene rubber (SBR), polyethylene oxide (PEO), cellulose, and polyacrylate.

In some embodiments, the selectively permeable membrane 130 can be made by filtering the selectively permeable membrane powder dispersion to fully cover the pores within the separator. In some embodiments, the selectively permeable membrane powders can be dispersed into a dispersing solution and can be configured to block the pores of the separator such that the effective porosity of the separator becomes about 0%. In some embodiments, the separator can include a ceramic material such that a hot press process can increase the selectively permeable membrane contact.

In some embodiments, the selectively permeable membrane 130 can include a conventional separator, e.g., as disclosed herein and in the '916 Publication. For instance, a conventional separator can be any membrane capable of ion transport, i.e., an ion-permeable membrane. In some embodiments, the separator can include a liquid impermeable membrane that permits the transport of ions therethrough, namely a solid or gel ionic conductor. In some embodiments the separator can be a porous polymer membrane infused with a liquid electrolyte that allows for the shuttling of ions between the cathode and the anode electroactive materials, while preventing the transfer of electrons. In some embodiments, the separator can be a microporous membrane that prevents particles forming the cathode and the anode compositions from crossing the membrane. In some embodiments, the separator can be a single or multilayer microporous separator. In some embodiments, the separator can include a polyethyleneoxide (PEO) polymer in which a lithium salt is complexed to provide lithium conductivity, or sulfonated tetrafluoroethylene based fluoropolymer-copolymer (e.g. Nafion™) membranes which are proton conductors. For example, PEO based electrolytes can be used as the separator, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 4 V with respect to Li metal. The operating temperature of the redox cell can be elevated as necessary to improve the ionic conductivity of the membrane.

In some embodiments, the selectively permeable membrane 130 can include a conventional separator, for example as described above, and further including a material configured to coat at least a portion of at least one surface of the selectively permeable membrane 130. In some embodiments, the selectively permeable membrane 130 can further include a material configured to substantially fill the pores of a conventional separator. In some embodiments, substantially all pores in a porous separator can be filled with a material including an anode active material such that the selectively permeable membrane becomes a second anode in the finished electrochemical cell. In some embodiments, substantially all pores in the porous separator can be filled with a material including a cathode active material such that the selectively permeable membrane becomes a second cathode in the finished electrochemical cell. In some embodiments, the material configured to fill the pores of the porous separator can include any of the redox electroactive materials described herein and in the '569 Patent, the '916 Publication, and the '646 publication.

In some embodiments, the material can be coated onto at least a portion of at least one surface of the separator. In some embodiments, the material can be deposited into the pores of the porous separator. In some embodiments, the material coated onto the surface of the separator can expand volumetrically during formation of the electrochemical cell 100. In some embodiments, expansion of the material during formation can cause the material to fill or partially fill the pores, making a liquid permeable membrane separator into a liquid impermeable membrane, e.g., the selectively permeable membrane 130. In some embodiments, the material can include an anode active material such as, for example, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

In some embodiments, the material configured to coat at least a portion of at least one surface of the separator and/or fill the pores of the porous separator may only partially fill the pores such that one end of each pore is filled but the aperture of each pore on the opposite side of the separator can remain unfilled. In some embodiments, the material coated onto at least a portion of at least one surface of the separator and/or fill the pores of the porous separator can be applied to and/or into the separator from the side of the separator configured to abut the anode in the finished electrochemical cell. Without wishing to be bound by any particular theory, during contact with a lithium anode, the high-capacity anode active materials can be lithiated and can expand volumetrically to fill or further fill the pores. In some embodiments, the material coated onto the separator can include a polymeric material, crosslinking agent, and/or other curable material that may hold the material in place on the separator and/or in the pores. In some embodiments, once the anode active material fills or further fills the pores, it can be cured or otherwise caused to gel or solidify. In some embodiments, the gelled or solidified active material can substantially block infiltration, e.g., wetting or flux therethrough, of the electrolyte for the cathode 110 to the anode 120 side of the electrochemical cell 100.

In some embodiments, self-terminated oligomers with hyperbranched architecture (STOBA®) can be coated onto the cathode side of the separator. Without wishing to be bound by any particular theory, the addition of a STOBA® material can prevent thermal runaway by allowing ions through the selectively permeable membrane at standard operating temperatures but disallowing ion transfer during higher than normal operating temperatures where the temperature of the electrochemical cell 100 exceeds a critical cross-linking temperature for the particular STOBA® material used. In some embodiments, the STOBA® material can be filled at least partially into the pores of the separator from the cathode side. In some embodiments, the STOBA® material can be coated onto the surface of the cathode 110, mixed into the cathode material, and/or coated onto the cathode active material before forming the cathode 110. In some embodiments, the STOBA® material can be coated onto the surface of the anode 120 between the anode 120 and the selectively permeable membrane 130 such that ions cannot penetrate the anode 120 under high-temperature (e.g., thermal runaway) conditions. In some embodiments, the STOBA® material can be selected to be compatible with the anode material such that the STOBA® material can be included in the anode 120 to prevent ion transfer from the anode 120 to the cathode 110 during an overcharging event. In some embodiments, less volatile solvent can be used in the electrolyte in combination with STOBA® material being coated onto the separator. In some embodiments, STOBA® material polymerization can be triggered and/or catalyzed by heat before the electrolyte solvent is vaporized. In some embodiments, PC, EC and/or GBL can be used in the cathode with STOBA® materials. Without wishing to be bound by any particular theory, when adding STOBA® materials, the heat generated during abuse conditions in cells may cause polymerization (cross-linking) of the STOBA® material which can shut down the cell before solvent vaporization (volatile gas production) can begin. In some embodiments, PC and GBL can exfoliate a graphite anode (e.g., 120). In some embodiments, PC and GBL can be used in the cathode 110 and two or more different electrolytes can be used in the cathode 110 and anode 120.

In some embodiments, STOBA® can be mixed into a semi-solid electrode slurry. In some embodiments, since semi-solid electrode manufacturing processes often do not require a dry process (whereas when NMC solvent is used, 100° C.-150° C. drying conditions are often required), polymerization temperature can often be lower than about 100° C.

In some embodiments, a polymer separator can be included between the selectively permeable membrane 130 and either the cathode 110 or the anode 120, e.g., the semi-solid anode. In some embodiments, the polymer separator can include polypropylene, polyethylene, a cellulosic-material, any other suitable polymeric material, or combinations thereof. In some embodiments, placing the polymer separator between the selectively permeable membrane 130 and either the cathode 110 or the anode 120 can increase wettability of the selectively permeable membrane 130 and/or reduction of unwanted side redox reactions. In some embodiments, when the polymer separator is wetted by the catholyte or anolyte, the polymer separator can become a gel polymer electrolyte sheet.

In some embodiments, the selectively permeable membrane 130 and/or a coating of a material on the selectively permeable membrane 130 can include a lithium-containing material. In some embodiments, during formation of the electrochemical cell 100, lithium ions from the lithium-containing material in the selectively permeable membrane 130 or the coating thereon can pre-lithiate the anode before the first charge-discharge cycle. Without wishing to be bound by any particular theory, pre-lithiation of the anode 120 can lead to formation of the SEI layer that may prevent lithium dendrite formation in the anode 120 during operation of the electrochemical cell 100. This may reduce irreversible capacity loss during battery formation and initial cycling. In addition, this can result in a formed electrochemical cell 100 with a higher energy density and/or power density because less of the anode 120 becomes unavailable during formation of the electrochemical cell 100. Without wishing to be bound by any particular theory, pre-lithiation can lead to a reduction in volumetric expansion of the anode 120 during initial cycling because less lithium ions become irreversibly trapped in the anode 120 material. This reduction in volumetric expansion of the anode during battery formation may lead to less mechanical failure of the electrochemical cell 100 due to fracture of the anode 120 and/or delamination of the anode 120 from the selectively permeable membrane 130.

In some embodiments, the selectively permeable membrane 130 can include a solid-state electrolyte material sheet or layer that is coated on at least one side with a glass or ceramic material. In some embodiments, the glass or ceramic material can be deposited onto the solid-state electrolyte material sheet by any suitable deposition method, including but not limited to chemical vapor deposition (CVD), physical vapor deposition (PVD), cold spray application, atomic layer deposition, metal-organic chemical vapor deposition, nitrogen-plasma assisted deposition, roll application, spray application, sputter deposition, reactive sputter deposition, spattering, melt quenching, mechanical milling, or combinations thereof. Without wishing to be bound by any particular theory, the deposition of such a glass or ceramic coating onto the solid-state electrolyte material sheet may prevent solvent diffusion, e.g., solvent anolyte diffusion, through the solid-state electrolyte material sheet. In some embodiments, the solid-state electrolyte material sheet can include a polymer separator as described above. In some embodiments, when the polymer separator is wetted by the catholyte or anolyte, the polymer separator can become a gel polymer electrolyte sheet. In some embodiment, PEO polymer film coated by pin-hole free thin solid electrolyte layer, for example, 1 micron amorphous LiPON layer by sputtering. In some embodiments, a LiPON layer can be used for the cathode side and PEO can be used for the anode side. Without wishing to be bound by any particular theory, since PEO has weak oxidation potential stabilities and LiPON may react with lithium metal, this combination may prevent these reactions. In some embodiments, LiPON can be sputtered onto a PEO dry film, and the PEO can become a gel polymer after assembling the electrochemical cell. In some embodiments, a LiPON layer can be used to separate the solvent electrolyte from the anode 120 and the cathode 110. In some embodiments, other solid-state electrolyte materials beside LiPON can be used, but amorphous or flexible lithium ion conductive coating may prevent crack formation. Other solid-state electrolyte materials can include PEO, PVDF, PAN, or combinations thereof.

In some embodiments, a ceramic layer can be interposed between the selectively permeable membrane 130 and the anode 120. In some embodiments, the ceramic layer can be at least partially coated with a diffusion preventing material, such as an oxy-nitride-containing material. In some embodiments, the diffusion preventing material can include lithium phosphorus oxy-nitride (LiPON), silicon phosphorus oxy-nitride (SiPON), lithium silicon phosphorus oxy-nitride (LiSiPON), lithium titanium silicon phosphorus oxy-nitride (LiTiSiPON), lithium sulfate oxy-nitride (LiSON), thio-Lithium Super Ionic CONductor (thio-LISICON), lithium phosphorous sulfide ($Li_3PS_4$), lithium tin phosphorous sulfide (LSPS, $Li_{10}SnP_2Si_2$), other suitable materials, or combinations thereof.

In some embodiments, the diffusion preventing material can be applied to one or both sides of the selectively permeable membrane 130. In some embodiments, the diffusion prevention material applied to the cathode side of the selectively permeable membrane 130 can be tailored to the chemistry of the cathode 110 and the selectively permeable membrane 130 such that substantially no diffusion of materials occurs therebetween. In some embodiments, the diffusion prevention material applied to the anode side of the selectively permeable membrane 130 can be tailored to the chemistry of the anode 120 and the selectively permeable membrane 130 such that substantially no diffusion of materials occurs therebetween.

In some embodiments, the diffusion preventing material applied to a surface of the selectively permeable membrane 130 can have a thickness of less than about 10 µm, about 9 µm, about 8 µm, about 7 µm, about 6 µm, about 5 µm, about 4 µm, about 3 µm, about 2 µm, about 1 µm, about 900 nm, about 800 nm, about 700 nm, about 600 nm, about 500 nm, about 400 nm, about 300 nm, about 200 nm, or about 100 nm, inclusive of all values and ranges therebetween. In some embodiments, the diffusion preventing material applied to a surface of the selectively permeable membrane 130 can have a thickness of greater than about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, or about 10 µm, inclusive of all values and ranges therebetween. In some embodiments, the diffusion preventing material applied to a surface of the selectively permeably membrane 130 can have a thickness in the range of about 100 nm and about 25 µm, about 200 nm and about 20 µm, about 300 nm and about 15 µm, about 400 nm and about 14 µm, about 500 nm and about 13 µm, about 600 nm and about 12 µm, about 700 nm and about 11 µm, about 800 nm and about 10 µm, about 900 nm and about 9 µm, about 1 µm and about 8 µm, about 2 µm and about 7 µm, about 3 µm and about 6 µm, about 500 nm and about 10 µm, about 500 nm and about 9 µm, about 500 nm and about 8 µm, about 500 nm and about 7 µm, about 500 nm and about 6 µm, about 500 nm and about 5 µm, about 500 nm and about 4 µm, about 500 nm and about 3 µm, about 500 nm and about 2 µm, about 500 nm and about 1 µm, about 100 µm and about 25 µm, about 200 nm and about 25 µm, about 300 nm and about 25 µm, about 400 nm and about 25 µm, about 500 nm and about 25 µm, about 600 nm and about 25 µm, about 700 nm and about 25 µm, about 800 nm and about 25 µm, about 900 nm and about 25 µm, about 1 µm and about 25 µm, about 2 µm and about 25 µm, about 3 µm and about 25 µm, about 4 µm and about 25 µm, about 5 µm and about 25 µm, about 6 µm and about 25 µm, about 7 µm and about 25 µm, about 8 µm and about 25 µm, about 9 µm and about 25 µm, about 10 µm and about 25 µm, about 15 µm and about 25 µm, or about 20 µm and about 25 µm, inclusive of all values and ranges therebetween.

In some embodiments, the selectively permeable membrane 130 is a solid-state electrolyte material sheet. For example, the solid-state electrolyte material sheet can be made from a solid-state electrolyte material and a binder. The solid-state electrolyte sheet chemically and fluidically isolates the cathode 110 from the anode 120. In some embodiments, the use of a solid-state electrolyte material sheet to chemically and fluidically isolate the cathode 110 from the anode 120 allows the catholyte to be different from the anolyte.

The solid-state electrolyte material can be a powder mixed with the binder and then processed (e.g. extruded, cast, wet cast, blown, etc.) to form the solid-state electrolyte material sheet. In some embodiments, solid-state electrolyte material is one or more of oxide-based solid electrolyte materials including a garnet structure, a perovskite structure, a phosphate-based Lithium Super Ionic Conductor (LISICON) structure, a glass structure such as $La_{0.51}Li_{0.34}TiO_{2.94}$, $Li_{1.3}Al_{0.3}Ti_{1.7}(PO_4)_3$, $Li_{1.4}Al_{0.4}Ti_{1.6}(PO_4)_3$, $Li_7La_3Zr_2O_{12}$, $Li_{6.66}La_3Zr_{1.6}Ta_{0.4}O_{12.9}$ (LLZO), $50Li_4SiO_4\cdot50Li_3BO_3$, $Li_{2.9}PO_{3.3}N_{0.46}$ (lithium phosphorousoxynitride, LiPON), $Li_{3.6}S_{10.6}P_{0.4}O_4$, $Li_3BN_2$, $Li_3BO_3$—$Li_2SO_4$, $Li_3BO_3$—$Li_2SO_4$—$Li_2CO_3$ (LIBSCO, pseudoternary system), and/or sulfide contained solid electrolyte materials including a thio-LISICON structure, a glassy structure and a glass-ceramic structure such as $Li_{1.07}Al_{0.69}Ti_{1.46}(PO_4)_3$, $Li_{1.5}Al_{0.5}Ge_{1.5}(PO_4)_3$, $Li_{10}GeP_2Si_2$ (LGPS), $30Li_2S\cdot26B_2S_3\cdot44LiI$, $63Li_2S\cdot36SiS_2\cdot1Li_3PO_4$, $57Li_2S\cdot38SiS_2\cdot5Li_4SiO_4$, $70Li_2S\cdot30P_2S_5$, $50Li_2S\cdot50GeS_2$, $Li_7P_3S_{11}$, $Li_{3.25}P_{0.95}S_4$, and $Li_{9.54}S_{11.74}P_{1.44}S_{11.7}Cl_{0.3}$, and/or closo-type complex hydride solid electrolyte such as $LiBH_4$—LiI, $LiBH_4$—$LiNH_2$, $LiBH_4$—$P_2S_5$, $Li(CB_xH_{x+1})$—LiI like $Li(CB_9H_{10})$—LiI, and/or lithium electrolyte salt bis(trifluoromethane)sulfonamide (TFSI), bis(pentalluoroethanesulfonyl)imide (BETI), bis(fluorosulfonyl)imide, lithium borate oxalato phosphine oxide (LiBOP), lithium bis(fluorosulfonyl)imide, amide-borohydride, $LiBF_4$, $LiPF_6$ LIF, or combinations thereof. In some embodiments, solid-state electrolyte material is about 40 wt. % to about 90 wt. %.

In some embodiments, the binder is a polymer, for example, a polyolefin. In some embodiments, the binder is copolymer (COP), polypropylene (PP), polyethylene (PE), polyethylene terephthalate (PET), polyphenylene sulfide (PPS), polyimide (PI), polyamide-imides (PAI), poly(amideesterimide) (PAEI), perfluoroalkoxy alkanes (PFA), polytetrafluoroethylene (PTFE), a polymeric dispersant, or combinations thereof. The binder can be selected to be resistant to swelling from the electrolyte solvent. In some embodiments, the binder comprises about 3 wt. % to about 70 wt. % of the solid-state electrolyte material sheet or composite film.

In some embodiments, the solid-state electrolyte material sheet further includes an active material to form a cathode composite film that functions as a second cathode for electrochemical cell 100. The cathode composite film can include the aforementioned solid-state electrolyte materials and binders. The cathode composite film can be flexible and can have no pin holes. The cathode composite film provides lithium ion transportation, prevents solvent migration between the electrodes, and provides capacity to the electrochemical cell with its active material. The second cathode can have the same active material as the first cathode. In preferred embodiments, the second cathode has a different active material than the first cathode to take advantage of the potential differences of the active materials. For example, the first cathode can be $Li(Ni, Mn, Co)O_2$ (NMC) (4.2-4.4

V) and the second cathode can be lithium iron phosphate (LFP) (3.3 V). In another example, the first cathode can be NMC (4.2-4.4 V) and the second cathode can be lithium titanate (LTO) (1.5 V). In another example, the first cathode can be lithium manganese nickel oxide (LMNO) (5V) and the second cathode can be LFP (3.3 V). In another example, the first cathode can be lithium manganese nickel oxide (LMNO) (5V) and the second cathode can be LTO (1.5 V).

In some embodiments, the cathode composite film that functions as the second cathode can be formed by coating, extrusion, casting, wet casting, blowing, co-extrusion, hot pressing, roll casting, slurrying and spin casting, ink-jet printing, solution casting, or combination processes thereof.

FIG. 1C is an electron microscope secondary electron image of a portion of a cathode composite film, according to an embodiment. In this example, 50 vol. % of a lithium iron phosphate (LFP) active material is bound in 50 vol. % of a polyolefin copolymer (COP) binder.

Figure 1D:
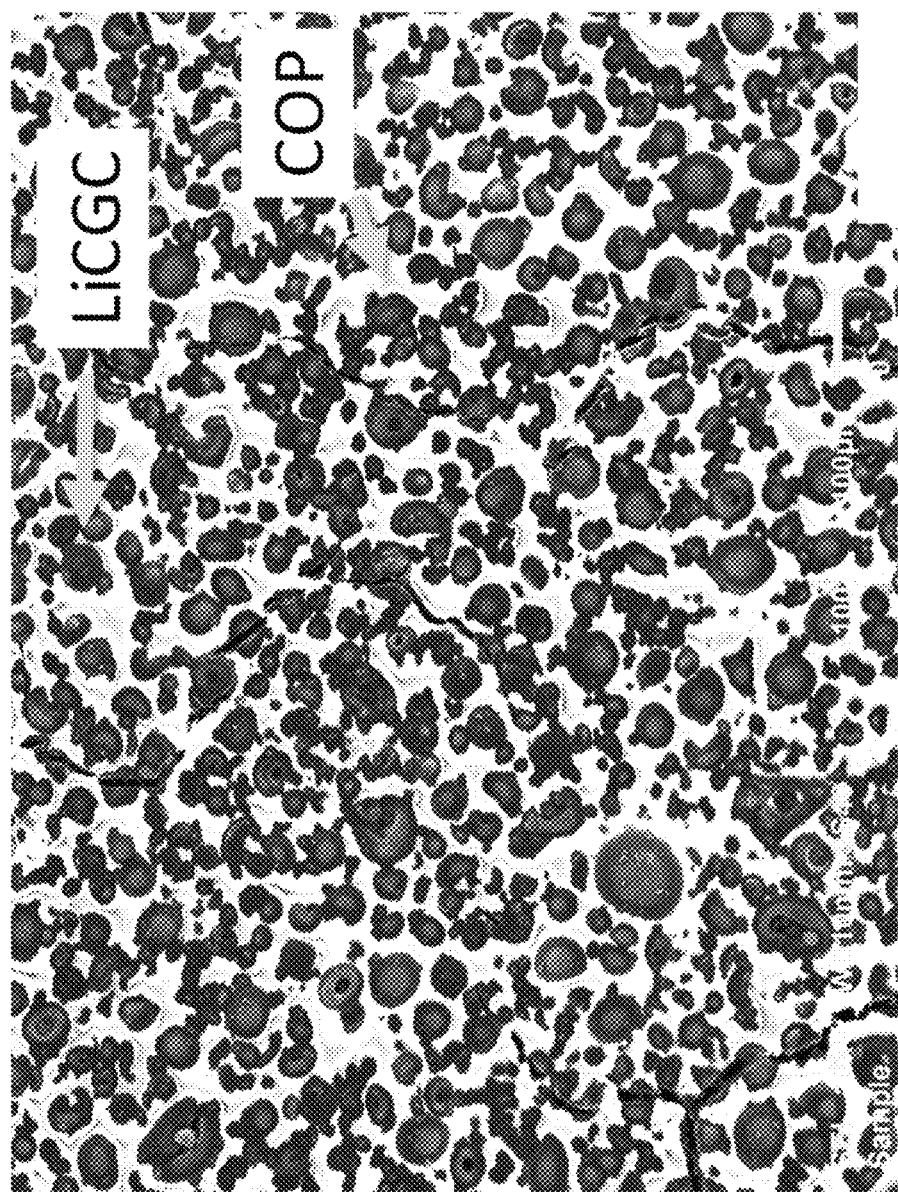
FIG. 1D is a scanning electron microscope image of a cathode composite film, according to an embodiment.

FIG. 1D is an electron microscope secondary electron image of a portion of a cathode composite film, according to an embodiment. In this example, 50 vol. % of a lithium ion conducting glass ceramic (LiCGC) active material is bound in 50 vol. % of a polyolefin copolymer (COP) binder and formed into a 0.4 µm thick film.

In some embodiments, a conductive layer is disposed between the first cathode and the second cathode (cathode composite film). The conductive layer can improve the electrical conductivity between the first cathode and the second cathode. The conductive layer can include a catholyte. In some embodiments, the catholyte within the conductive layer is the same catholyte that is contained within the first cathode. In some embodiments, the conductive layer is a carbon paste including a catholyte, the catholyte being the same catholyte as the first cathode.

In some embodiments, the solid-state electrolyte material sheet or the cathode composite film can have a thickness in the range of between about 0.1 µm and about 50 µm, about 4 µm and about 45 µm, about 6 µm and about 40 µm, about 8 µm and about 35 µm, about 10 µm and about 30 µm, about 12 µm and about 25 µm, about 14 µm and about 20 µm, about 16 µm and about 18 µm, about 0.1 µm and about 48 µm, about 0.1 µm and about 44 µm, about 0.1 µm and about 40.1 µm, about 0.1 µm and about 40 µm, about 0.1 µm and about 38 µm, about 0.1 µm and about 36 µm, about 0.1 µm and about 34 µm, about 0.1 µm and about 32 µm, about 0.1 µm and about 30 µm, about 0.1 µm and about 28 µm, about 0.1 µm and about 26 µm, about 0.1 µm and about 24 µm, about 0.1 µm and about 22 µm, about 0.1 µm and about 20 µm, about 0.1 µm and about 18 µm, about 0.1 µm and about 16 µm, about 0.1 µm and about 14 µm, about 0.1 µm and about 12 µm, about 0.1 µm and about 10 µm, about 0.1 µm and about 9 µm, about 0.1 µm and about 8 µm, about 0.1 µm and about 7 µm, about 0.1 µm and about 6 µm, about 0.1 µm and about 5 µm, about 2 µm and about 4 µm, about 2 µm and about 3 µm, about 4 µm and about 50 µm, about 6 µm and about 50 µm, about 8 µm and about 50 µm, about 10 µm and about 50 µm, about 12 µm and about 50 µm, about 14 µm and about 50 µm, about 16 µm and about 50 µm, about 18 µm and about 50 µm, about 20 µm and about 50 µm, about 22 µm and about 50 µm, about 24 µm and about 50 µm, about 26 µm and about 50 µm, about 28 µm and about 50 µm, about 30 µm and about 50 µm, about 32 µm and about 50 µm, about 34 µm and about 50 µm, about 36 µm and about 50 µm, about 38 µm and about 50 µm, about 40 µm and about 50 µm, about 42 µm and about 50 µm, about 44 µm and about 50 µm, about 46 µm and about 50 µm, or about 48 µm and about 50 µm, inclusive of all values and ranges therebetween.

By way of example only, if a sulfur-containing separator material, e.g., a $Li_2S$—$S_2P_5$ solid-state electrolyte, is used as the selectively permeable membrane 130, a coating of about 1 µm of LiPON can be applied to both sides of the selectively permeable membrane 130. Without wishing to be bound by any particular theory, the diffusion preventing material may prevent the diffusion of sulfur from the selectively permeable membrane 130 into the catholyte and/or anolyte. In some embodiments, a ceramic or glass-embedded polymer separator can be positioned to abut a first surface of the sulfur-containing separator material, in which case a diffusion preventing material such as LiPON can be added to only a second surface of the sulfur-containing separator material. In some embodiments, a sulfur-containing solid-state electrolyte and a LiPON coating can be combined. Without wishing to be bound by any particular theory, since the sulfur containing solid-state electrolyte has particle boundaries and since LiPON has an amorphous structure with no clear boundary, the non-boundary structure may be more robust for preventing short circuit by lithium dendrite formation.

In some embodiments, the cathode 110 can include about 20% to about 75% by volume, about 40% to about 75% by volume, about 50% to about 75% by volume, or about 60% to about 80% by weight of an active material, inclusive of all values and ranges therebetween. In some embodiments, the cathode 110 can include about 0.5% to about 25% by volume, about 0.5% to about 15% by volume, about 1.0% to about 6% by volume, or about 1% to about 6% by weight of a conductive material, inclusive of all values and ranges therebetween. In some embodiments, the cathode 110 can include about 25% to about 70% by volume, about 30% to about 50% by volume, about 20% to about 40% by volume, or about 20% to about 40% by weight of a catholyte, inclusive of all values and ranges therebetween. In some embodiments, the catholyte can include a liquid electrolyte such as a non-aqueous liquid electrolyte. In some embodiments, the cathode 110 can include less than about 10% by volume, less than about 5% by volume, less than about 3% by volume, or less than about 1% by volume of a polymeric binder, inclusive of all values and ranges therebetween. In some embodiments, the polymeric binder can comprise polyvinylidene difluoride (PVDF) or other fluorinated polymer or polyethylene terephthalate (PET) or poly phenylene sulfide (PPS) or poly ether-ether ketone (PEEK) or polyimide (PI) or polyvinyl chloride (PVC) or styrene butadiene rubber (SBR), polyethylene oxide (PEO), cellulose, PP, PE, PAI, PAEI, PFA, PTFE, or polyacrylate. In some embodiments, the cathode 110 can have a thickness in the range of about 25 µm to about 2,000 µm.

In some embodiments, the cathode 110 is disposed on the cathode current collector 115 and the anode 120 is disposed on the anode current collector 125. The electrodes can be disposed onto the current collectors via any suitable method, for example, coating, casting, drop coating, pressing, roll pressing, or combinations thereof. For example, a semi-solid electrode material can be coated, casted, calendered and/or pressed on the current collector. The cathode current collector 115 and the anode current collector 125 can include any current collector materials that are electronically conductive and are electrochemically inactive under the operation conditions of the cell. Typical current collectors for lithium cells include copper, aluminum, or titanium for the negative current collector and aluminum for the positive current collector, in the form of sheets or mesh, or any combination thereof.

The semi-solid cathode (e.g., 110) can include an ion-storing solid phase material, which can include, for example, an active material and/or a conductive material. The quantity of the ion-storing solid phase material can be in the range of about 0% to about 80% by volume. The cathode can include an active material such as, for example, a lithium bearing compound (e.g., Lithium Iron Phosphate (LFP), $LiCoO_2$, $LiCoO_2$ doped with Mg or Ti or W, $LiNiO_2$, Li(Ni, Co, Al)$O_2$ (known as "NCA"), Li(Ni, Mn, Co)$O_2$ (known as "NMC"), $LiNi_{0.5}Co_{0.5}O_2$, $LiMn_2O_4$ and its derivatives, $LiNi_{0.5}Mn_{1.5}O_4$, lithium ion conducting glass ceramic (LiCGC), etc. The cathode can also include a conductive material such as, for example, graphite, carbon powder, pyrolytic carbon, carbon black, carbon fibers, carbon microfibers, carbon nanotubes (CNTs), single walled CNTs, a few or multi walled CNTs, fullerene carbons including "bucky balls," graphene sheets and/or aggregate of graphene sheets, any other conductive material, alloys or combination thereof. The cathode can also include a non-aqueous liquid electrolyte such as, for example, ethylene carbonate, dimethyl carbonate, diethyl carbonate, an alkyl carbonate mixture with $LiPF_6$ (SSDE) or any other electrolyte described herein or combination thereof.

In some embodiments, the cathode 110 can include an active material such as a lithium-bearing compound as described in further detail below. In some embodiments, the cathode 110 can also include a conductive material such as, for example, graphite, carbon powder, pyrolytic carbon, carbon black, carbon fibers, carbon microfibers, CNTs, single walled CNTs, multi walled CNTs, fullerene carbons including "bucky balls," graphene sheets and/or aggregate of graphene sheets, any other conductive material, alloys or combination thereof. In some embodiments, the cathode 110 can also include a non-aqueous liquid electrolyte as described in further detail herein.

In some embodiments, the anode 120 can include about 50 wt % to about 75 wt % of an active material, about 0.5 wt % to about 2 wt % of a conductive material, and about 20 wt % to about 40 wt % by weight of a non-aqueous liquid electrolyte. The anode 120 can have a thickness in the range of about 25 μm to about 2,000 km.

In some embodiments, the anode 120 can be a semi-solid stationary anode. In some embodiments, the solid-state stationary anode can include an electrolyte that is chemically compatible with the active material of the anode, the anode current collector, and the selectively permeable membrane 130. In some embodiments, the solid-state anode can be coated with the selectively permeable membrane 130 such that ions pass between the cathode 110 and the anode 120.

In some embodiments, the anode 120 can be a conventional anode, for example, a calendered anode. In some embodiments, the anode 120 can include a lithium metal. In some embodiments, the lithium metal is in the form of a lithium metal sheet. In some embodiments, the anode 120 can include an active material, a conductive material, and/or an electrolyte. In some embodiments, the quantity of the ion-storing solid phase material in the anode 120 can be in the range of about 0 vol % to about 80 vol %. The semi-solid anode can include an anode active material such as, for example, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

The anode 120 can also include a carbonaceous material such as, for example, graphite, carbon powder, pyrolytic carbon, carbon black, carbon fibers, carbon microfibers, CNTs, single walled CNTs, multi walled CNTs, fullerene carbons including "bucky balls", graphene sheets and/or aggregate of graphene sheets, any other carbonaceous material or combination thereof. In some embodiments, the anode can also include a non-aqueous liquid electrolyte as described in further detail herein.

In some embodiments, the anode 120 can be a lithium metal foil anode. In some embodiments, a pure lithium metal foil or lithium alloy (Al, W, Sn, Mg, etc.) foil can be used. In some embodiments, the alloy percentage can be between about 0.5 at % to 50 at %. In some embodiments, a lithium metal or lithium metal alloy layer can be between about 20 microns and about 600 microns in thickness.

Current collector materials can be selected to be stable at the operating potentials of the positive and negative electrodes of the electrochemical cell 100. For example, in non-aqueous lithium systems, the cathode current collector 115 can include aluminum, or aluminum coated with conductive material that does not electrochemically dissolve at operating potentials of 2.5-5.5 V with respect to $Li/Li_3O$. Such materials include platinum, gold, nickel, titanium, conductive metal oxides such as vanadium oxide, and carbon. The anode current collector 125 can include copper or other metals that do not form alloys or intermetallic compounds with lithium, carbon, and/or coatings comprising such materials disposed on another conductor.

In some embodiments, each of the cathode current collector 115 and the anode current collector 125 can have a thickness of less than about 25 microns, for example, about 5 microns, 6 microns, 7 microns, 8 microns, 9 microns, 10 microns, 12 microns, 14 microns, 16 microns, or 18 microns, or 20 microns, inclusive of all ranges therebetween. Use of such a thin cathode current collector 115 and anode current collector 125 can substantially reduce the cost and overall weight of the electrochemical cell 100.

In some embodiments, the cathode current collector 115 can include a tab coupled to a positive lead. In some embodiments, the tab can be cut to a desired length for coupling with the positive lead. The positive lead can be a strip of a conducting metal (e.g., copper or aluminum) which can be coupled to the tab using any suitable method, for example, ultrasonic welding, clamping, crimping, adhesive tape, or combinations thereof.

In some embodiments, the anode current collector 125 also includes a tab coupled to a negative lead. In some embodiments, the tab can be cut to a desired length for coupling with the negative lead. The negative lead can be substantially similar to the positive lead, and is not described in further detail herein.

In some embodiments, the cathode 110 and the anode 120 can include active materials and optionally conductive materials in particulate form suspended in a non-aqueous or aqueous liquid electrolyte. In some embodiments, the cathode 110 and/or anode 120 particles (e.g., cathodic or anodic particles) can have an effective diameter of at least about 1 μm. In some embodiments, the cathodic or anodic particles have an effective diameter between about 1 μm and about 10 μm. In other embodiments, the cathodic or anodic particles have an effective diameter of at least about 10 m or more. In some embodiments, the cathodic or anodic particles have an effective diameter of at less than about 1 μm. In other embodiments, the cathodic or anodic particles have an effective diameter of at less than about 0.5 µm. In other embodiments, the cathodic or anodic particles have an effective diameter of at less than about 0.25 µm. In other embodiments, the cathodic or anodic particles have an effective diameter of at less than about 0.1 µm. In other embodiments, the cathodic or anodic particles have an effective diameter of at less than about 0.05 µm. In other embodiments, the cathodic or anodic particles have an effective diameter of at less than about 0.01 m.

In some embodiments, particles can have shapes including but not limited to spheres, platelets, or rods to optimize solids packing fraction, increase the semi-solid's net electronic conductivity, and improve rheological behavior of semi-solids. In some embodiments, low aspect or substantially equiaxed or spherical particles are used to improve the ability of the semi-solid to flow under stress.

In some embodiments, the particles have a plurality of sizes so as to increase packing fraction. In particular, the particle size distribution can be bi-modal, in which the average particle size of the larger particle mode is at least 5 times larger than average particle size of the smaller particle mode. In some embodiments, the mixture of large and small particles improves flow of the material during cell loading and increases solid volume fraction and packing density in the loaded cell.

In some embodiments, the semi-solid electrode technology and production method thereof, as described herein, can successfully constrain the electrolyte within the electrode material so that it is unique for this structure to match the semi-solid electrodes with the selectively permeable membrane 130, lithium metal anode or all solid-state electrode. In some embodiments, selectively permeable membrane 130 can be non-flammable, can exhibit high Li$^+$ transfer, can be highly stable, and/or can prevent shortage due to lithium dendrite and/or contamination particles. In some embodiments, the selectively permeable membrane 130 in combination with cathode side sealing and/or anode side sealing may enable a semi-solid electrode with different electrolytes for the cathode or the anode. In some embodiments, the use of the selectively permeable membrane may result in more effective wetting of the interface between the selectively permeable membrane 130 and the abutting electrodes and may increase the ion transfer in the cell and improve safety tolerance comparing to traditional lithium ion products.

In some embodiments, the electrochemical cell 100 can be configured to include the selectively permeable membrane 130 disposed between the cathode 110 and the anode 120. In other words, in some embodiments, the electrochemical cell 100 can operate without the use of an ion-permeable membrane such as a conventional separator and instead the cathode 110 can directly abut a first surface of the selectively permeable membrane 130 while the anode 120 directly abuts a second surface of the selectively permeable membrane 130. In some embodiments, the selectively permeable membrane 130 can be configured to be chemically non-reactive with both the cathode 110 and the anode 120. In some embodiments, the selectively permeable membrane 130 can be electronically insulating and ionically conductive.

In some embodiments, the cathode 110 and the anode 120 with the selectively permeable membrane 130 interposed can be packaged in a single unit cell structure and/or a bi-cell structure. Examples of such single unit cell structures and bi-cell structures are disclosed in U.S. Patent Publication 2017/0025646 (hereafter "the '646 publication"), filed Jun. 17, 2016, entitled "Single Pouch Battery Cells and Methods of Manufacture," hereby incorporated by reference in its entirety herein. Without wishing to be bound by any particular theory, using the selectively permeable membrane 130 may allow the use of a different electrolyte for the cathode than the electrolyte used for the anode.

In some embodiments, the selectively permeable membrane 130 can be coated on the surface of a traditional electrode or on the surface of a semi-solid electrode to, in part, block liquid leakage between the electrodes. In some embodiments, the selectively permeable membrane 130 can take any form factor, including but not limited to a sheet, film, rectangle, square, circle, and any combination thereof.

In some embodiments, the use of the selectively permeable membrane 130 to chemically and fluidically isolate the cathode 110 from the anode 120 means that the catholyte can be different from the anolyte. In other words, the catholyte does not have to be stable under reduction potential, which may allow for use of a wider range of electrolytes. For instance, water-based electrolytes and/or fluorine-, sulfone-, or nitrile-based solvents. In some embodiments, this also means the electrolyte additive for catholyte does not have to be stable under reduction potential, which may allow for use of a wide range of cathode SEI formation additives, including but not limited to trimethylene sulfate, triallyl phosphate, 3,3'-sulfonyldipropionitrile, or other suitable additives. On the other hand, in some embodiments, the anolyte does not have to be stable under oxidation potential. In other words, since the potential corrosion of aluminum or other materials under oxidation potential does not need to be taken into account, a wider range of electrolytes can be used. For instance, LiTFSI-, LiFSI-, LiBOB-, LiBOP-, LiDFOB-, LiClO$_4$-, or LiBETI-containing electrolytes and/or ionic liquid-, glyme-, or NMP-containing solvents, and/or PEO or PVDF-HFP-containing polymer electrolytes, or combinations thereof can be used. In some embodiments, this also means the electrolyte additive for anode does not have to be stable under oxidation potential, which may allow for use of a wide range of additives. For instance, VC, biphenyl, ethylene sulfite, trimethyl borate (TMB). In some embodiments, for lithium metal anodes, one of several additives well suited to preventing lithium dendrite formation can be selected. For instance, in some embodiments, Li$_3$N, Li$_2$O, fluoroethylene carbonate (FEC), difluoroethylene carbonate (DiFEC), bis(2,2,2-trifluoroethyl) carbonate (TFEC), methyl-2,2,2-trifluoroethyl carbonate, 2,2,3,4,4,4-hexafluorobutyl methyl carbonate (HFBMC), or another suitable additive can be selected.

In some embodiments, the selectively permeable membrane 130 can be resistant to dendrite penetration while also being highly conductive of lithium ions. In some embodiments, lithium ion conductivity can be greater than about $10^{-6}$ S/cm, about $10^{-5}$ S/cm, about $10^{-4}$ S/cm, about $10^{-3}$ S/cm, about $10^{-2}$ S/cm, and about $10^{-1}$ S/cm.

In some embodiments, the selectively permeable membrane 130 can be formed by solution mixing, melt mixing, in situ precipitation, electrochemical deposition, physical or chemical vapor deposition, or combination thereof. In some embodiments, the selectively permeable membrane 130 can be co-extruded, hot pressed, roll casted, slurried and spin casted, ink-jet printed, casted, solution casted, and co-extruded. In some embodiments, a hot press process can be used to reduce the porosity for coated separators, e.g., separators including a ceramic material.

In some embodiments, the electrochemical cell 100 can include the semi-solid cathode (e.g., 110) abutting the selectively permeable membrane 130 and a lithium-containing anode active material infused with a liquid electrolyte, e.g., in a single unit cell and/or bi-cell structure. In some embodiments, the anode 120 can be a dry stage without a liquid electrolyte. In some embodiments, the electrolyte in the semi-solid cathode (e.g., 110) does not have to be stable under reduction potential, which may allow for use of a wider range of electrolytes. For instance, water-based electrolytes and/or fluorine-based electrolytes can be used.

In some embodiments, the electrochemical cell 100 can include a semi-solid anode (e.g., the anode 120) with the selectively permeable membrane 130 and cathode active materials mixed with the selectively permeable membrane 130 in a single unit cell and/or bi-cell structure. In some embodiments, the cathode 110 can be a dry stage without a liquid electrolyte. In some embodiments, the electrolyte in the semi-solid anode (e.g., 120) does not have to be stable under oxidation potential, which may allow for use of a wider range of electrolyte. In some embodiments, for example, 1,2-dimethoxyethane, N-methylpyrrolidone, or other electrolyte materials can be used.

In some embodiments, the semi-solid electrode slurries can include the liquid electrolyte mixed with one or multiple active electrode materials with or without conductive carbon and/or other functional additives. In some embodiments, the semi-solid electrode slurries can then be used for making a semi-solid electrode.

In some embodiments, the selectively permeable membrane 130 can be manufactured as a thin film and matched with a semi-solid electrode (e.g., 110) or a lithium electrode (e.g., 120).

In some embodiments, the semi-solid electrode can be chemically and/or fluidically isolated at least in part by the selectively permeable membrane 130. In some embodiments, the selectively permeable membrane 130 can be used with a pre-mixed electrode/pallet as a unit cell in a single unit structure or bi-cell structure such as described in the '646 publication.

In some embodiments, a method of surface treating can be used in which specified chemical(s) is/are introduced to further improve the wettability between the semi-solid electrode and the selectively permeable membrane 130. By way of example only, thin $Li_2CoO_3$ (preferably less than about 10 microns and more preferably less than about 1 micron) can be coated on a solid anode and configured to directly abut a semi-solid cathode. In some embodiments, thin lithium metal, $TiO_2$, or other materials (preferably less than about 10 microns and more preferably less than about 1 micron) can be coated on to the solid electrolyte. In some embodiments, this coating can be disposed onto the solid electrolyte by vapor deposition, which may reduce lithium ion transfer between solid and solid interface.

In some embodiments, the selectively permeable membrane 130 can include one or more of oxide-based solid electrolyte materials including a garnet structure, a perovskite structure, a phosphate-based Lithium Super Ionic Conductor (LISICON) structure, a glass structure such as $La_{0.51}Li_{0.34}TiO_{2.94}$, $Li_{1.3}Al_{0.3}Ti_{1.7}(PO_4)_3$, $Li_7La_3Zr_2O_{12}$, $Li_{6.66}La_3Zr_{1.6}Ta_{0.4}O_{12.9}$ (LLZO), $50Li_4SiO_4 \cdot 50Li_3BO_3$, $Li_{2.9}PO_{3.3}N_{0.46}$ (lithium phosphorousoxynitride, LiPON), $Li_{3.6}S_{10.6}P_{0.4}O_4$, $Li_3BN_2$, $Li_3BO_3-Li_2SO_4$, $Li_3BO_3-Li_2SO_4-Li_2CO_3$ (LIBSCO, pseudoternary system), and/or sulfide contained solid electrolyte materials including a thio-LISICON structure, a glassy structure and a glass-ceramic structure such as $Li_{1.07}Al_{0.69}Ti_{1.46}(PO_4)_3$, $Li_{1.5}Al_{0.5}Ge_{1.5}(PO_4)_3$, $Li_{10}GeP_2Si_2$ (LGPS), $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_7P_3S_{11}$, $Li_{3.25}P_{0.95}S_4$, and $Li_{9.54}S_{11.74}P_{1.44}S_{11.7}Cl_{0.3}$, and/or closo-type complex hydride solid electrolyte such as $LiBH_4-LiI$, $LiBH_4-LiNH_2$, $LiBH_4-P_2S_5$, $Li(CB_xH_{x+1})-LiI$ like $Li(CB_9H_{10})-LiI$, and/or lithium electrolyte salt bis(trifluoromethane)sulfonamide (TFSI), bis(pentalluoroethanesulfonyl)imide (BETI), bis(fluorosulfonyl)imide, lithium borate oxalato phosphine oxide (LiBOP), lithium bis(fluorosulfonyl)imide, amide-borohydride, $LiBF_4$, $LiPF_6$, or combinations thereof. In some embodiments, any of those materials described for use with the selectively permeable membrane 130 can have an amorphous phase and/or a crystalline or partially crystalline phase. In some embodiments, a dopant (e.g., a metal) can be included in the selectively permeable membrane 130. In some embodiments, a surface of any of these materials and/or the selectively permeable membrane 130 can be coated with an additional material configured to reduce boundary or interfacial resistance, e.g., with at least one of the cathode, catholyte, anode, anolyte, and additives therein. In some embodiments, one of these electrolyte materials can be disposed within or adjacent to the cathode while a different of these electrolyte materials can be disposed within or adjacent to the anode. In some embodiments, the anolyte can include electrolyte materials (e.g., LiBOP) which would otherwise be detrimental to the cathode. In some embodiments, the catholyte can include fluorine type electrolytes (e.g., FEC) which would otherwise be reduced in the anode side, however, the fluorine type electrolytes can be added to the cathode (e.g., semi-solid cathode) since the anode and cathode are fluidically and/or chemically isolated each from the other. In some embodiments, the selectively permeable membrane 130 can be substantially non-porous and substantially ion-permeable. In some embodiments, a hot press process can be used to reduce the porosity for coated separators, e.g., separators including a ceramic material.

In some embodiments, the selectively permeable membrane 130 can include a polymer material to increase the mechanical strength of the selectively permeable membrane 130. In some embodiments, the polymer material can include a polyether, a fluoropolymer, PVDF, PTFE, PVF, PHFP, other suitable polymers, or combinations thereof mixed with electrolyte salts including but not limited to FSI, TFSI, $LiBF_4$, etc. In some embodiments, when the selectively permeable membrane 130 is disposed between the cathode 110 and the anode 120, the selectively permeable membrane 130 can be sufficiently durable without the use of a polymer additive. In some embodiments, when the selectively permeable membrane 130 is disposed directly between the cathode 110 and the anode 120, it can be helpful to include a polymer additive such that the selectively permeable membrane 130 has the mechanical strength to function as the separator under the temperature and pressure conditions of normal operation of the electrochemical cell 100.

In some embodiments, the selectively permeable membrane 130 can be stable at temperatures less than about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., or greater than about 170° C.

In some embodiments, the selectively permeable membrane 130 can have a thickness that is between about 1 μm and about 250 μm, about 2 μm and about 200 μm, about 5 μm and about 175 μm, about 10 μm and about 150 μm, about 20 μm and about 125 μm, about 50 μm and about 100 μm, about 1 μm and about 150 μm, about 1 μm and about 125 μm, about 1 μm and about 100 μm, about 50 μm and about 250 μm, about 75 μm and about 250 μm, about 100 μm and about 250 µm and about 200 µm and about 250 µm, inclusive of all values and ranges therebetween. In some embodiments, the selectively permeable membrane 130 can have a thickness that is greater than about 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, 125 µm, 130 µm, 135 µm, 140 µm, 145 µm, 150 µm, 155 µm, 160 µm, 165 µm, 170 µm, 175 µm, 180 µm, 185 µm, 190 µm, 195 µm, 200 µm, 205 µm, 210 µm, 215 µm, 220 µm, 225 µm, 230 µm, 235 µm, 240 µm, 245 µm, or 250 µm, inclusive of all values and ranges therebetween. In some embodiments, the selectively permeable membrane 130 can have a thickness that is less than about 250 µm, 225 µm, 200 µm, 185 µm, 175 µm, 150 µm, 125 µm, 100 µm, 75 µm, 50 µm, 45 µm, 25 µm, 20 µm, 15 µm, 14 µm, 13 µm, 12 µm, 11 µm, 10 µm, 9 µm, 8 µm, 7 µm, 6 µm, 5 µm, 4 µm, 3 µm, 2 µm, or 1 µm, inclusive of all values and ranges therebetween.

In some embodiments, the selectively permeable membrane 130 can have an elastic modulus (ratio of stress to strain) of greater than about 1, 1.01, 1.1, 1.15, 1.2, 1.25, 1.3, 1.35, 1.4, 1.5, 1.6, 1.7, 1.8, 1.9, 2, 2.5, 3, 3.5, 4, 4.5, 5, 6, 7, 8, 9, or 10, inclusive of all values and ranges therebetween. In some embodiments, the selectively permeable membrane 130 can have an ultimate tensile strength of greater than about 5 MPa, 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 100 MPa, 125 MPa, or 150 MPa, inclusive of all values and ranges therebetween.

In some embodiments, the selectively permeable membrane 130 can have an expected lifespan relative to a conventional separator material (e.g., PEO) of greater than about 50%, 60%, 70%, 80%, 90%, 95%, or 99%, inclusive of all values and ranges therebetween.

In some embodiments, the selectively permeable membrane 130 can include an antioxidant additive including but not limited to quinone, hydroquinone, phenolic antioxidants, phosphorous antioxidants, sulfur antioxidants, amine-based antioxidants, oxides thereof, or combinations thereof. In some embodiments, the antioxidant additive can be between about 0.01 wt % to about 20 wt % of the selectively permeable membrane, about 0.1 wt % to about 19 wt %, about 0.5 wt % to about 18 wt %, about 0.75 wt % to about 17 wt %, about 1 wt % to about 16 wt %, about 1.25 wt % to about 15 wt %, about 1.5 wt % to about 10 wt %, or about 2 wt % to about 5 wt %, inclusive of all values and ranges therebetween. In some embodiments, the antioxidant additive can be greater than about 0.01 wt % of the selectively permeable membrane, greater than about 0.1 wt %, 0.5 wt %, 1 wt %, 2 wt %, 3 wt %, 4 wt %, 5 wt %, 6 wt %, 7 wt %, 8 wt %, 9 wt %, 10 wt %, 15 wt %, 20 wt %, or greater than about 25 wt %, inclusive of all values and ranges therebetween. In some embodiments, the antioxidant additive can be less than about 25 wt % of the selectively permeable membrane, less than about 20 wt %, 15 wt %, 10 wt %, 9 wt %, 8 wt %, 7 wt %, 6 wt %, 5 wt %, 4 wt %, 3 wt %, 2 wt %, 1 wt %, 0.5 wt %, 0.1 wt %, or 0.01 wt %, inclusive of all values and ranges therebetween.

In some embodiments, the selectively permeable membrane 130 can withstand high voltage conditions of greater than about 0.1 V, 0.5 V, 1 V, 1.5 V, 1.75 V, 2 V, 2.5 V, 3 V, 3.5 V, 4 V, 4.5 V, 4.6 V, 4.7 V, 4.8 V, 4.9 V, 5.0 V, 5.1 V, 5.2 V, 5.3 V, 5.4 V, 5.5 V, 5.6 V, 5.7 V, 5.8 V, 5.9 V, or greater than about 6.0 V. In some embodiments, the selectively permeable membrane 130 can be configured to operate under normal voltage conditions of between about 0.5 V and about 5.5 V, about 1.5 V and about 5.0 V, about 2 V and about 4.5 V, about 2.5 V and about 4.25 V, about 2.75 V and about 4.0 V, and about 3 V and about 4.0 V, inclusive of all values and ranges therebetween. In some embodiments, the selectively permeable membrane 130 can be configured to operate under normal voltage conditions of greater than about 1.0 V, 1.5 V, 2.0 V, 2.5 V, 3.0 V, 3.5 V, 4.0 V, 4.5 V, 4.6 V, 4.7 V, 4.8 V, 4.9 V, 5 V, 5.1 V, 5.2 V, 5.3 V, 5.4 V, or 5.5 V, inclusive of all values and ranges therebetween.

In some embodiments, the electrolyte for the non-semi-solid electrode (e.g., conventional electrode) can be a solid-state (dry) electrolyte. In some embodiments, the electrolyte for the non-semi-solid electrode (e.g., conventional electrode) can be a plasticized or gelled electrolyte. In some embodiments, the electrolyte for the non-semi-solid electrode (e.g., conventional electrode) can include a polymer material to increase the mechanical strength of the selectively permeable membrane 130.

In some embodiments, the electrochemical cell 100 can be configured such that the anode/cathode electrolyte includes polycarbonate, water, and/or γ-butyrolactone (GBL). In some embodiments, the selectively permeable membrane 130 (e.g., on the anode side) can be polypropylene-based since it may be more difficult to wet polycarbonate with $LiNiMnCoO_2$ (NMC). In some embodiments, the selectively permeable membrane 130 (e.g., on the cathode side) can be a non-woven material coated with NMC or a similar agent since this may be wetted by polycarbonate, GBL, and/or water. In some embodiments, the electrochemical cell 100 can include a separator, e.g., a poly imide base or other non-woven base, that may be wetted by polycarbonate, GBL, and/or water. In some embodiments, there is no solid separator between the anode 120 and the cathode 110. In some embodiments, a porous (e.g., film) selectively permeable membrane 130 is disposed between the anode 120 and the cathode 110 in a two electrolyte battery system. In some embodiments, when at least one of the cathode 110 and the anode 120 contain an active material and a conductive material in a liquid electrolyte, the cathode 110 can be fluidically isolated from the anode 120 by, at least in part, increasing the absolute viscosity of the cathode 110 and/or the anode 120 above a threshold. In some embodiments, the threshold viscosity can be greater than about 25 cP, 50 cP, 75 cP, 100 cP, 125 cP, 150 cP, 175 cP, 200 cP, 250 cP, 500 cP, 750 cP, 1,000 cP, 2,500 cP, 5,000 cP, 7,500 cP, 10,000 cP, or 20,000 cP, inclusive of all values and ranges therebetween.

FIG. 1E is a schematic illustration of an electrochemical cell, according to an embodiment. FIG. 1E can be similar in construction to FIG. 1B, described above, but further comprises a separator 131. Separator 131 can be a conventional separator that provides electrical isolation between the cathode 110 and anode 120, but otherwise allows electrolyte to pass therethrough. Separator 131 can be a conventional separator because the selectively permeable membrane 130 is configured to isolate the catholyte of cathode 110 chemically and/or fluidically from the anolyte of anode 120. In some embodiments, separator 131 is a polyolefin film, a polyethylene film, a polypropylene film, a non-woven film, a cellulous film, or combination thereof.

FIG. 1F is a schematic illustration of a portion of an selectively permeable membrane 130, according to an embodiment. The selectively permeable membrane 130 can include a solid-state electrolyte material 133, which allows lithium ions having a positive charge to pass therethrough as illustrated by arrow AA. The selectively permeable membrane 130 can also include a binder 132, for example a polyolefin, that provides chemical and/or fluidic isolation of the anolyte and the catholyte and that binds the solid-state electrolyte material 133 within the selectively permeable membrane 130. In some embodiments, the selectively permeable membrane 130 also provides electrical isolation to prevent an electrical charge from passing therethrough.

FIG. 1G is a schematic illustration of a portion of an selectively permeable membrane 130, according to an embodiment. The selectively permeable membrane can include an active material 134 and a solid-state electrolyte powder to form a cathode composite film, which serves as a lithium ion conductor that allows lithium ions having a positive charge to pass therethrough as illustrated by arrow AA and also allows electrons have a negative charge to pass therethrough as illustrated by arrow BB. The selectively permeable membrane 130 can also include a binder 132, for example a polyolefin, that provides chemical and/or fluidic isolation of the anolyte and the catholyte and that binds the solid-state active material 134 within the selectively permeable membrane. In one example, a cathode composite film comprising 70 vol. % LFP, 5 vol. % carbon, 10 vol. % solid-state electrolyte powder ($Li_{1.4}Al_{0.4}Ti_{1.6}(PO_4)_3$, and 15 vol. % polypropylene binder. Cathode composite films can be used in combination with traditional separators which provide electrical isolation between the cathode and anode.

The description of the aforementioned embodiments also applies to the following embodiments mutatis mutandis, except where expressly stated otherwise or mutually exclusive.

Figure 2:
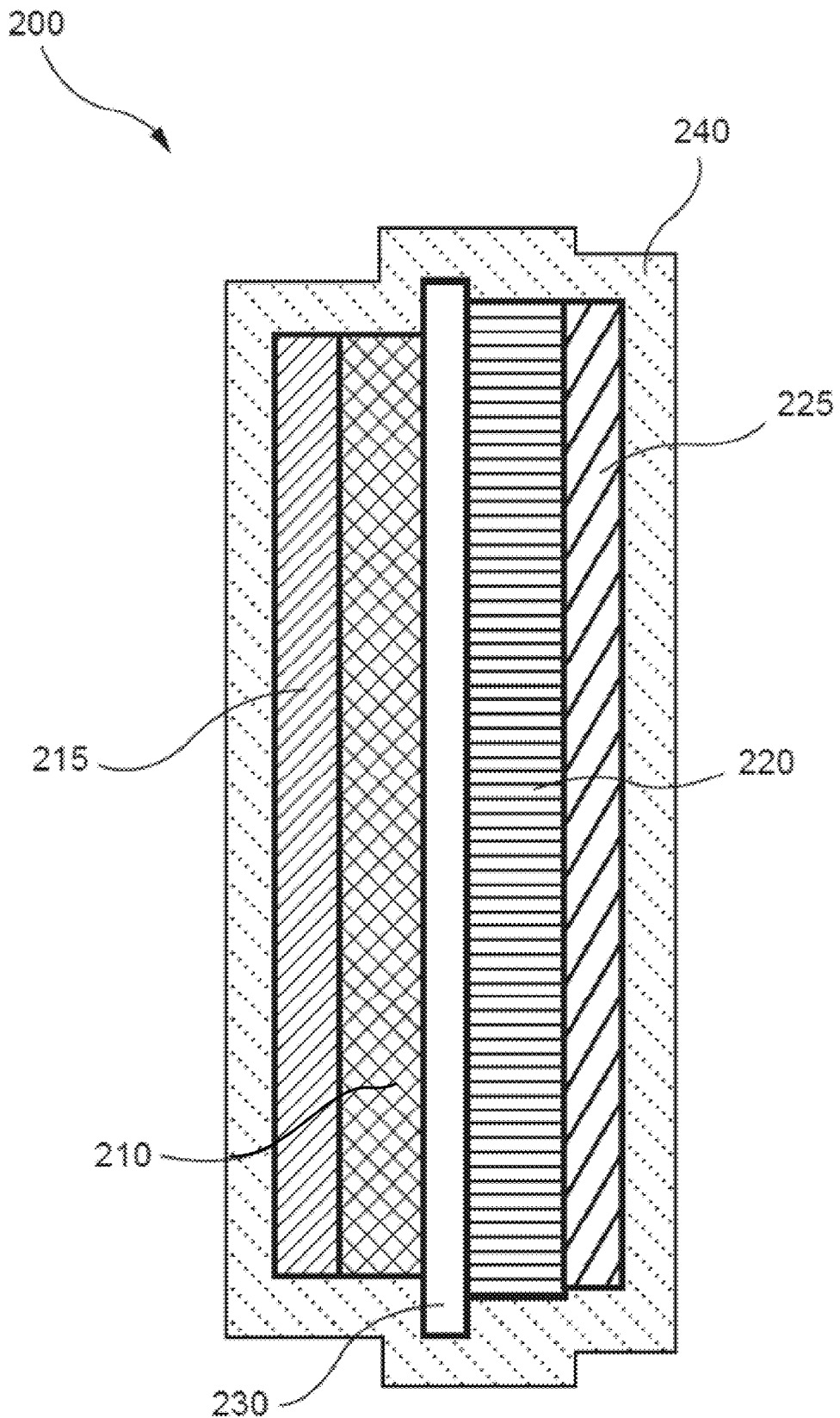
FIG. 2 is a schematic illustration of an electrochemical cell, according to an embodiment.

FIG. 2 illustrates an electrochemical cell 200 including a cathode 210 (e.g., semi-solid electrode material or solid-state electrode material) including a first electrolyte disposed on a cathode current collector 215 (e.g., aluminum foil). In some embodiments, the electrochemical cell 200 can include an anode 220 (e.g., semi-solid electrode material or solid-state electrode material) including a second electrolyte on an anode current collector 225 (e.g., copper foil). In some embodiments, the cathode 210 and the anode 220 can be separated by a selectively permeable membrane 230. In some embodiments, the selectively permeable membrane 230 can include at least one of LGPS, LaLiTiO, LiPON, other suitable electrolyte materials as described herein, or combinations thereof. In some embodiments, the electrochemical cell 200 can be surrounded by a plastic film 240 such as a pouch material. In some embodiments, the plastic film 240 can be coupled (e.g., laminated) to a second surface of the cathode current collector 215 and/or a second surface of the anode current collector 225.

Figure 3:
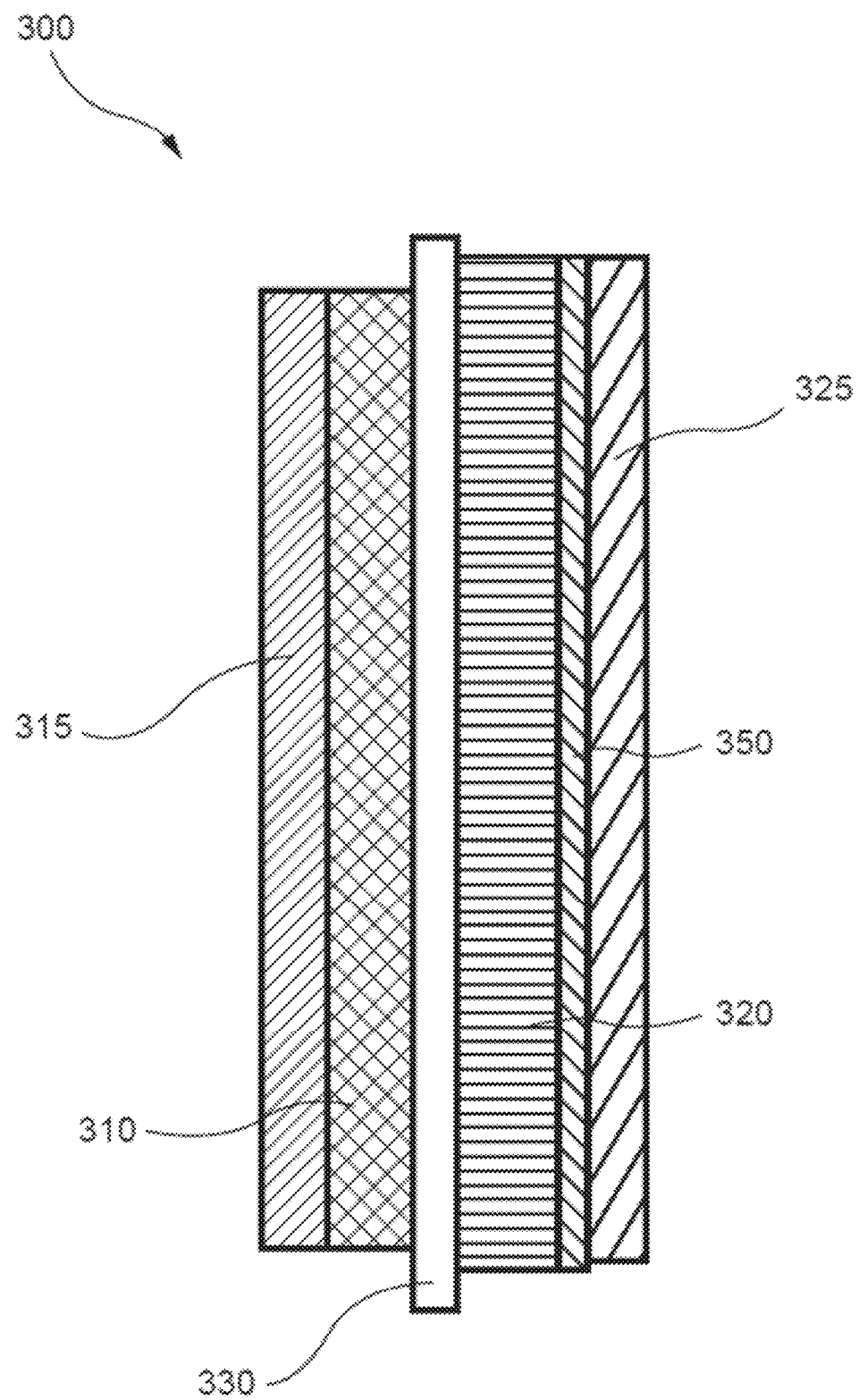
FIG. 3 is a schematic illustration of an electrochemical cell, according to an embodiment.

FIG. 3 illustrates an electrochemical cell 300 including a cathode 310 (e.g., semi-solid electrode material or solid-state electrode material) including a first electrolyte disposed on a cathode current collector 315 (e.g., aluminum foil). In some embodiments, the electrochemical cell 300 can include an anode 320 (e.g., semi-solid electrode material or solid-state electrode material) including a second electrolyte on an anode current collector 325 (e.g., copper foil). In some embodiments, a lithium metal layer 350 can be disposed between the anode 320 and a first surface of the anode current collector 325. In some embodiments, the cathode 310 and the anode 320 can be separated by a selectively permeable membrane 330. In some embodiments, the electrochemical cell 300 can be surrounded by a plastic film such as a pouch material. In some embodiments, the plastic film can be coupled (e.g., laminated) to a second surface of the cathode current collector 315 and/or a second surface of the anode current collector 325.

Figure 4:
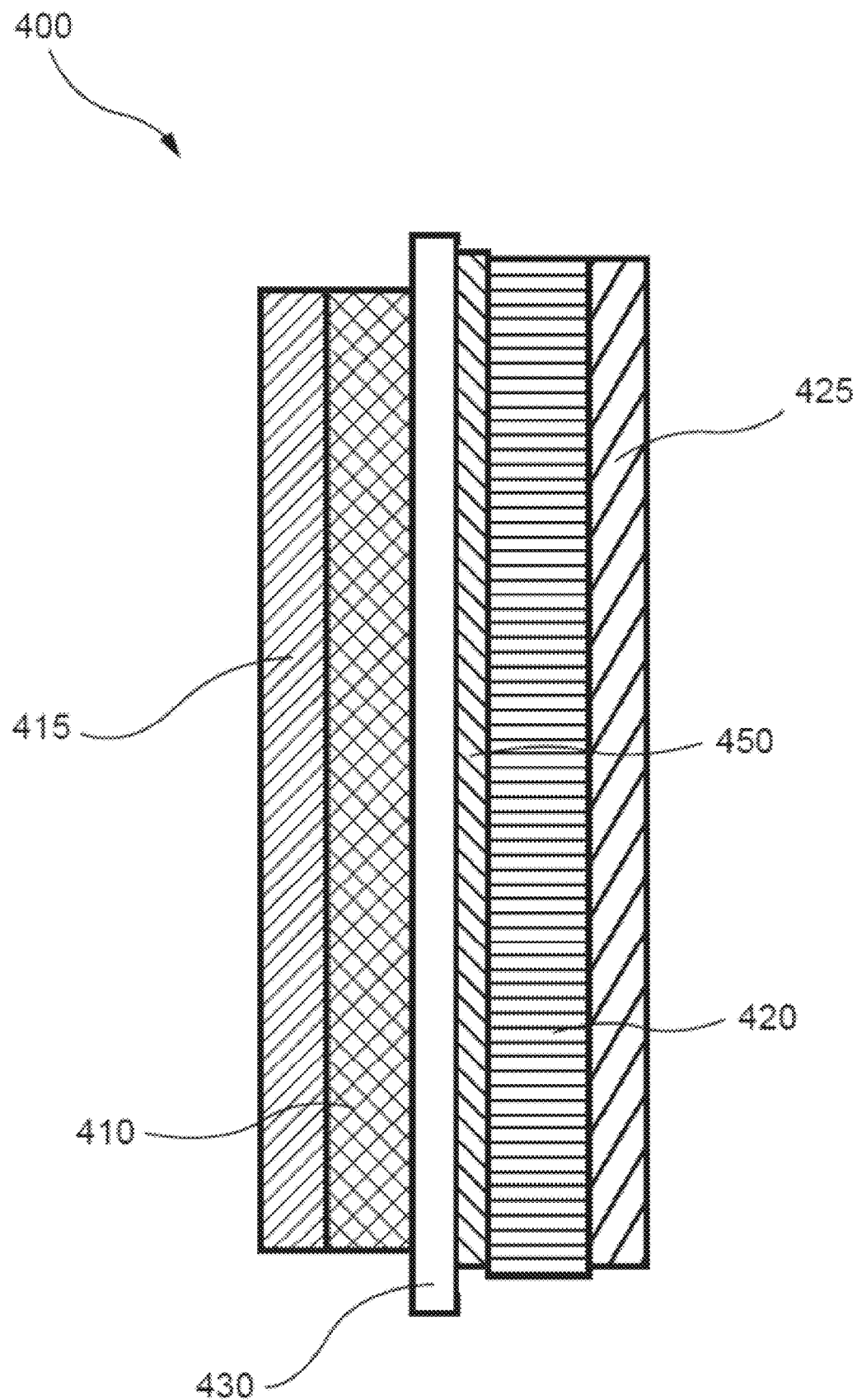
FIG. 4 is a schematic illustration of an electrochemical cell, according to an embodiment.

FIG. 4 illustrates an electrochemical cell 400 including a cathode 410 (e.g., semi-solid electrode material or solid-state electrode material) including a first electrolyte disposed on a cathode current collector 415 (e.g., aluminum foil). In some embodiments, the electrochemical cell 400 can include an anode 420 (e.g., semi-solid electrode material or solid-state electrode material) including a second electrolyte on an anode current collector 425 (e.g., copper foil). In some embodiments, a metal oxide layer 450, for example including $TiO_2$ or a lithium metal oxide, can be disposed between the anode 420 and a selectively permeable membrane 430. In some embodiments, the cathode 410 and the anode 420 can be separated by the selectively permeable membrane 430. In some embodiments, the electrochemical cell 400 can be surrounded by a plastic film such as a pouch material. In some embodiments, the plastic film can be coupled (e.g., laminated) to a second surface of the cathode current collector 415 and/or a second surface of the anode current collector 425.

Figure 5:
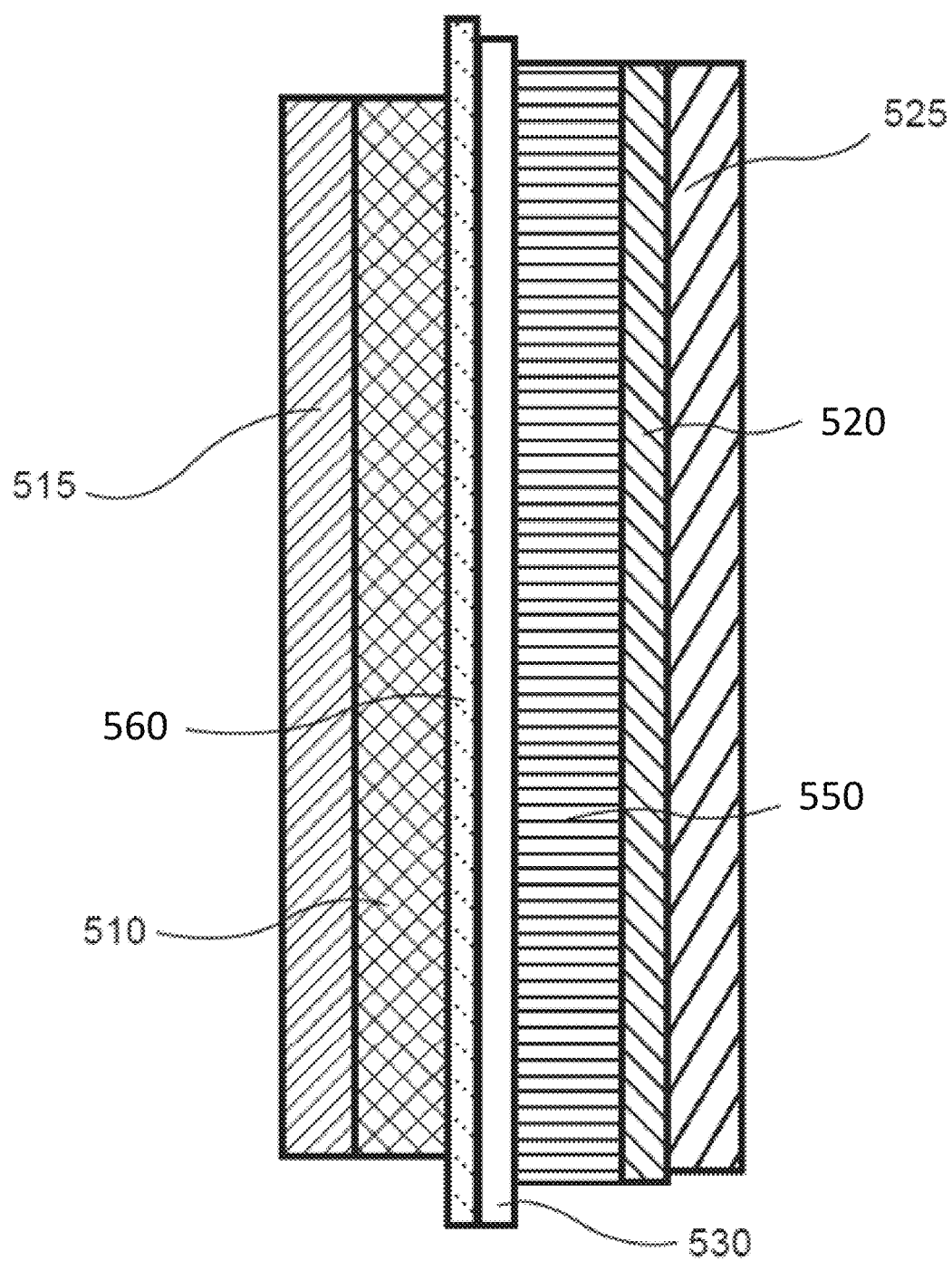
FIG. 5 is a schematic illustration of an electrochemical cell, according to an embodiment.

FIG. 5 illustrates an electrochemical cell 500 including a cathode 510 (e.g., semi-solid electrode material or solid-state electrode material) including a first electrolyte disposed on a cathode current collector 515 (e.g., aluminum foil). In some embodiments, the electrochemical cell 500 can include an anode 520 (e.g., semi-solid electrode material or solid-state electrode material) including a second electrolyte on an anode current collector 525 (e.g., copper foil). In some embodiments, a metal oxide layer 550, for example including $TiO_2$ or a lithium metal oxide, can be disposed between the anode 520 and a selectively permeable membrane 530. In some embodiments, the cathode 510 and the anode 520 can be separated by the selectively permeable membrane 530. In some embodiments, an active material layer 560, such as an $Li_2CoO_3$ layer, can be disposed between the cathode material and the selectively permeable membrane 530. The active material layer 560 can include, but is not limited to active materials such as $Li_2CoO_3$, LFP, NMC, LMO, or combinations thereof. Adding another active material in a layer between the cathode 510 and the selectively permeable membrane 530 can improve wettability of electrolyte, reduce contact resistance, and lead to the formation a different SEI layer. Typically, an SEI layer would be created between an electrolyte and solid state electrolyte interface. However, adding thin layer of active material leads to the formation of a different SEI on top of the active material layer. Between the solid electrolyte and active material layer (e.g. LCO) is a solid to solid interface, with no other interface being created.

In some embodiments, the electrochemical cell 500 can be surrounded by a plastic film such as a pouch material. In some embodiments, the plastic film can be coupled (e.g., laminated) to a second surface of the cathode current collector 515 and/or a second surface of the anode current collector 525.

Figure 6:
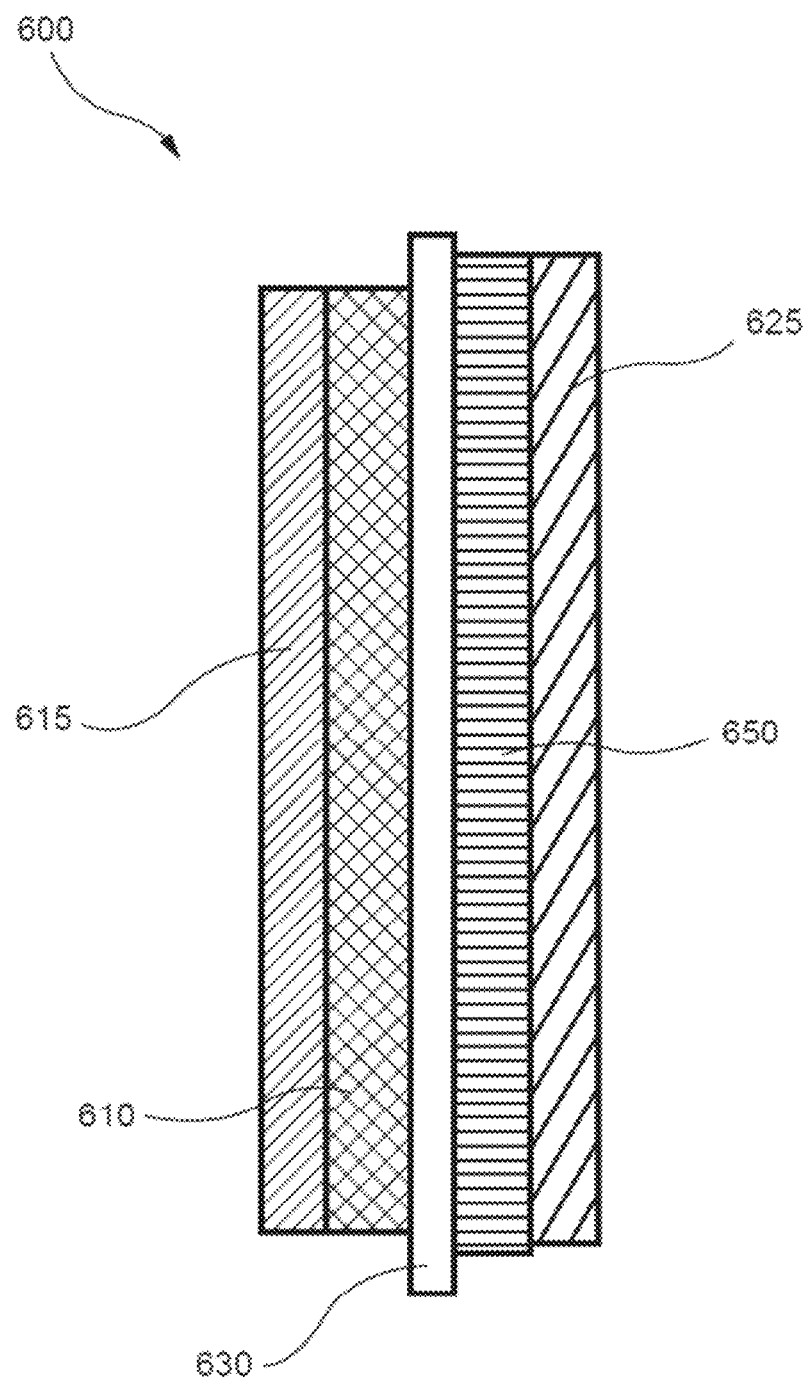
FIG. 6 is a schematic illustration of an electrochemical cell, according to an embodiment.

FIG. 6 illustrates an electrochemical cell 600 including a cathode 610 (e.g., semi-solid electrode material or solid-state electrode material) including a first electrolyte disposed on a cathode current collector 615 (e.g., aluminum foil). In some embodiments, the electrochemical cell 600 can include a lithium-containing metal material 650 (e.g., solid-state lithium material) on a first surface of an anode current collector 625 (e.g., copper foil). In some embodiments, a metal oxide layer, for example including $TiO_2$ or a lithium metal oxide, can be disposed between the lithium metal material 650 and a selectively permeable membrane 630. In some embodiments, the cathode 610 and the lithium metal material 650 can be separated by the selectively permeable membrane 630. In some embodiments, the electrochemical cell 600 can be surrounded by a plastic film such as a pouch material. In some embodiments, the plastic film can be coupled (e.g., laminated) to a second surface of the cathode current collector 615 and/or a second surface of the anode current collector 625.

Figure 7:
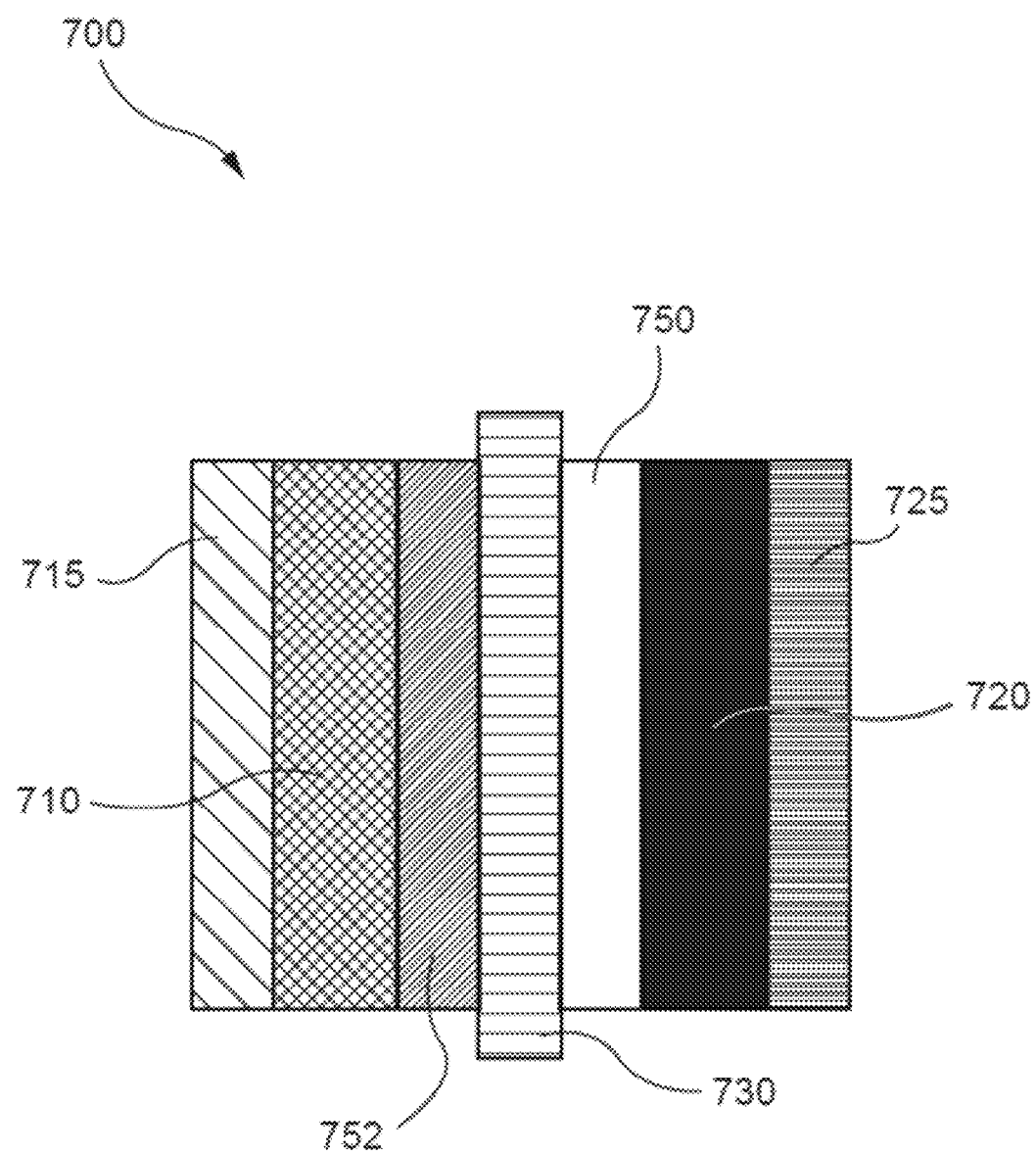
FIG. 7 is a schematic illustration of an electrochemical cell, according to an embodiment.

FIG. 7 illustrates an electrochemical cell 700 including a cathode 710 disposed on a cathode current collector 715, an anode 720 disposed on an anode current collector 725, and a selectively permeable membrane 730 disposed between the cathode 710 and the anode 720. In some embodiments, a first film 750 can be disposed between the cathode 710 and the selectively permeable membrane 730 that is capable of wetting both the cathode and the selectively permeable membrane 730 and is configured to be chemically compatible with the cathode 710 and the selectively permeable membrane 730. In some embodiments, a second film 752 can be disposed between the anode 720 and the selectively permeable membrane 730 that is capable of wetting both the anode 720 and the selectively permeable membrane 730 and is configured to be chemically compatible with the anode 720. Wetting reduces the internal resistance (i.e. contact resistance) of the electrochemical cell 700.

In some embodiments, at least one of the first film 750 and the second film 752 can include an electrolytic composition. In some embodiments, the selectively permeable membrane 730 can be a solid-state anode composite, for example a lithium-containing solid-state anode composite. In some embodiments, the anode 720 (e.g., solid-state anode composite) can be manufactured using any suitable printing, casting, or lamination technique. In some embodiments, the method by which the selectively permeable membrane 730 is disposed onto the cathode 710 or the anode 720 can include co-extrusion, hot pressing, roll casting, slurrying and spin casting, ink-jet printing, casting, solution casting, and co-extrusion.

In some embodiments, a lithium salt can be added to the anode 720 to promote fast lithium ion conduction through the solid-state anode. Suitable lithium salts may include, but are not limited to, lithium bis(trifluoromethanesulfonyl) imide (LiTFSI), lithium tetrafluoroborate ($LiBF_4$), lithium iodide (LiI), lithium bromide (LiBr), and lithium chloride (LiCl). In some embodiments, effective mole ratios of solid-state anode material to lithium salt can range from about 1:1 to about 99:1.

Figure 8:
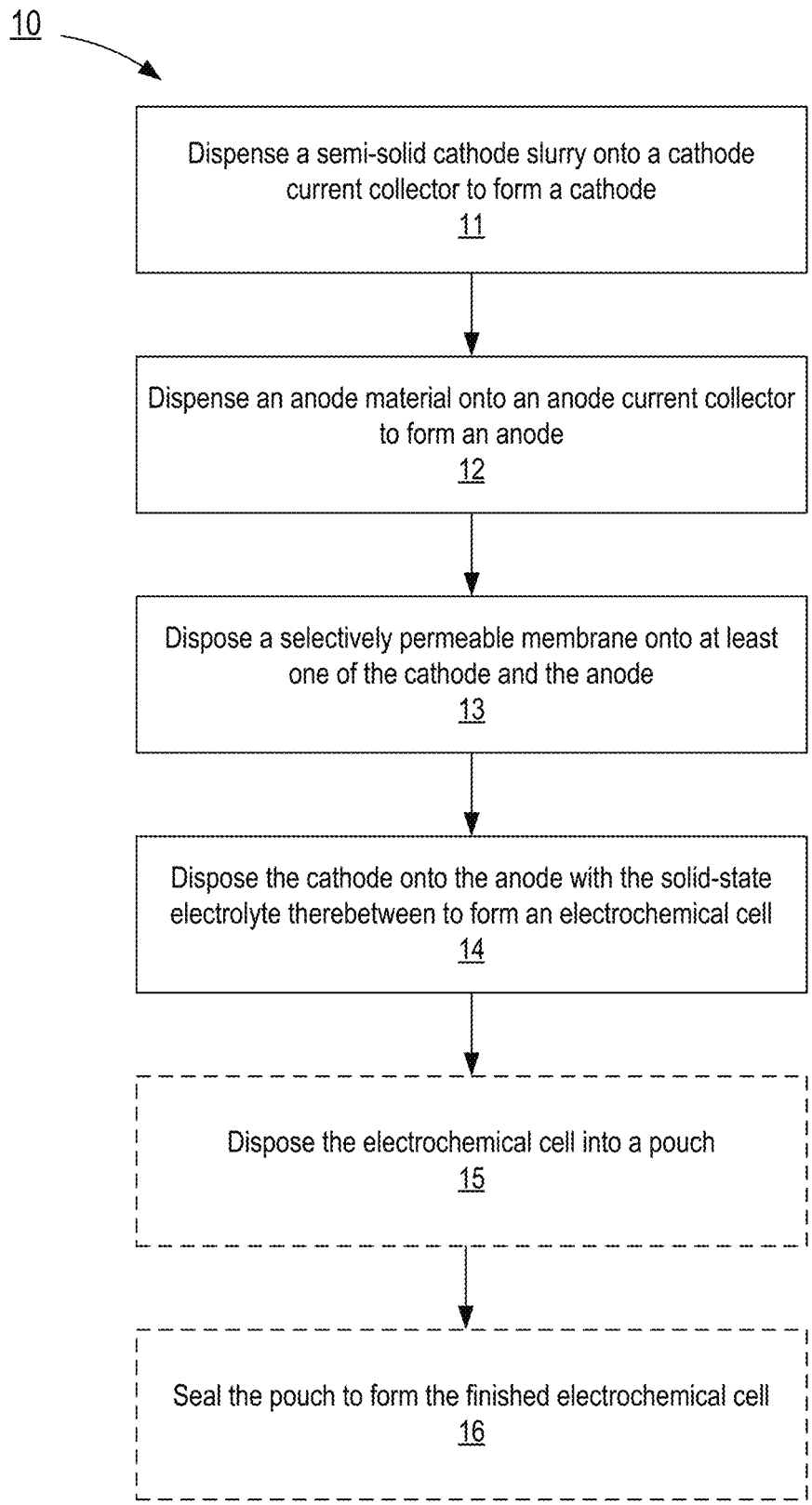
FIG. 8 illustrates a method for manufacturing an electrochemical cell, according to an embodiment.

FIG. 8 illustrates a method 10 of forming an electrochemical cell including a cathode, a cathode current collector, an anode, an anode current collector, and a selectively permeable membrane disposed between the cathode and the anode. In some embodiments, at least one of the cathode and the anode can include a semi-solid active material that includes a slurry of an active material and a conductive material in a liquid electrolyte. In some embodiments, the liquid electrolyte can be an aqueous liquid electrolyte. In some embodiments, the liquid electrolyte can be a non-aqueous liquid electrolyte.

In some embodiments, the method 10 includes dispensing a semi-solid cathode slurry onto a current collector to form a cathode in step 11. In some embodiments, the semi-solid cathode slurry can be prepared, mixed, and dispensed according to any suitable method, for example, as described in the '569 Patent.

In some embodiments, the method 10 includes dispensing an anode material onto an anode current collector to form an anode in step 12. In some embodiments, if the anode material is a semi-solid, dispensing step 12 can be substantially similar to dispensing step 11. In some embodiments, the anode material can be a conventional anode material and the anode material can be formed into a slurry of the active material and the conductive material with a solvent. In some embodiments, the anode material slurry can be spread or otherwise dispersed across the surface of the anode current collector. In some embodiments, the anode material slurry can be dried to remove the solvent and the resulting formed electrode can be calendered to increase the density of the anode material and achieve a uniform thickness of the material across the surface of the anode current collector.

In some embodiments, the method 10 includes disposing the selectively permeable membrane onto at least one of the cathode and the anode in step 13. In some embodiments, the selectively permeable membrane described herein can be disposed on the surface of the anode opposite the anode current collector. In some embodiments, the selectively permeable membrane, e.g., in the shape of a film, can be extruded, spread, laminated, rolled and/or printed onto the anode. Alternatively, in some embodiments, the selectively permeable membrane, e.g., in the shape of a film, can be extruded, spread, laminated, rolled, and/or printed onto a second selectively permeable membrane disposed onto the cathode. Whereas step 13 can include disposing the selectively permeable membrane onto the anode, step 13 can alternatively or additionally include disposing the selectively permeable membrane onto the cathode material.

In some embodiments, the method 10 includes disposing the cathode onto the anode with the selectively permeable membrane therebetween to form an electrochemical cell in step 14. In some embodiments, the selectively permeable membrane can include a surface coating on a surface of the cathode and/or the anode. In some embodiments, the selectively permeable membrane can include the functionalization of a surface of a cathode and/or the anode. Whereas step 14 can include disposing the selectively permeable membrane between a semi-solid cathode slurry and the anode, step 14 can alternatively or additionally include disposing the selectively permeable membrane between a semi-solid anode slurry and the cathode.

In some embodiments, the method 10 optionally includes disposing the electrochemical cell into a pouch in step 15. In some embodiments, the electrochemical cell can be enclosed in pouch material to form a single pouch battery cell. As used herein, the term "single pouch battery cell" refers to a battery cell (also referred to herein as "electrochemical cell") including a pouch typically containing one unit cell assembly, which further includes one anode, one cathode, and optionally, one separator. In some embodiments, one anode, one cathode, and one selectively permeable membrane can be stacked together to form a unit cell assembly, at least one of the anode and the cathode optionally including a semi-solid electrode material. In some embodiments, each unit cell assembly also includes conductive tabs (also referred to as a lead) to couple the electrodes to external circuits.

In some embodiments, pouch materials can include laminates (e.g., multi-layer sheets), formed into, for example, two or three solid film-like layers and bound together by adhesive. The word "laminate" as used herein can also refer to layers of material that are not chemically adhered to one another. For example, the layers can be in areal contact with each other and coupled using other coupling methods, such as, for example, heat sealing. In some embodiments, the pouch can formed from polypropylene, for example, cast propylene.

In some embodiments, the method 10 optionally includes sealing the pouch to form the finished electrochemical cell in step 16. In some embodiments, multiple unit cell assemblies can then be stacked or arrayed together to form a battery cell. In some embodiments, the number of unit cell assemblies in a battery cell can vary depending on, for example, the desired capacity and/or thickness of the resulting battery cell. In some embodiments, these stacked unit cell assemblies are electrically in parallel, and respective tabs in each unit cell assembly can be welded together via welding processes such as resistance welding, laser welding, and ultrasonic welding, seam welding, electric beam welding, among others. In some embodiments, optional step 16 can include a vacuum pouch sealing step to form a battery cell. During vacuum pouch sealing, an electrolyte is typically injected into the stacked unit cell assembly and the unit cell assemblies and the electrolyte are sealed into the pouch.

FIG. 9 illustrates a method for manufacturing an electrochemical cell, according to an embodiment. The electrochemical cell includes a cathode, a cathode current collector, an anode, an anode current collector, and a selectively permeable membrane disposed between the cathode and the anode. In some embodiments, at least one of the cathode and the anode can include a semi-solid active material that includes a slurry of an active material and a conductive material in a liquid electrolyte. In some embodiments, the liquid electrolyte can be an aqueous liquid electrolyte. In some embodiments, the liquid electrolyte can be a non-aqueous liquid electrolyte.

In some embodiments, the method 20 includes dispensing a semi-solid cathode slurry onto a current collector to form a cathode (not shown). In some embodiments, the semi-solid cathode slurry can be prepared, mixed, and dispensed according to any suitable method, for example, as described in the '569 Patent.

In some embodiments, the method 20 includes dispensing an anode material onto an anode current collector to form an anode in step 21. In some embodiments, if the anode material is a semi-solid, dispensing step 21 can be substantially similar to dispensing the semi-solid cathode slurry onto a current collector to form the cathode. In some embodiments, the anode material can be a conventional anode material and the anode material can be formed into a slurry of the active material and the conductive material with a solvent. In some embodiments, the anode material slurry can be spread or otherwise dispersed across the surface of the anode current collector. In some embodiments, the anode material slurry can be dried to remove the solvent and the resulting formed electrode can be calendered to increase the density of the anode material and achieve a uniform thickness of the material across the surface of the anode current collector.

In some embodiments, the method 20 includes disposing a sealing material onto the anode in step 22. The sealing material can be disposed around a perimeter of the anode material on the anode current collector. In some embodiments, the sealing material is a prefabricated film comprising one piece, or two more pieces arranged together to form a continuous perimeter around the anode material. In some embodiments, the sealing material is viscous liquid adhesive that dispensed onto the anode current collector. In some embodiments, the sealing material is a heat sealing film that forms a seal by the application of heat and/or pressure. In some embodiments, the sealing material is a hot melt adhesive film. In some embodiments, the sealing material is pressure sensitive adhesive. In some embodiments, the sealing material cures to form the seal. In some embodiments, the sealing material cures with heat and/or moisture. Whereas step 22 includes disposing the sealing material onto the anode, step 22 can alternatively or additionally include disposing the sealing material onto the cathode.

In some embodiments, the method 20 includes disposing a selectively permeable membrane onto the sealing material positioned on the anode in step 23. In some embodiments, the selectively permeable membrane described herein is also disposed on the surface of the anode material opposite the anode current collector. In some embodiments, the selectively permeable membrane, e.g., in the shape of a film, can be extruded, spread, laminated, rolled and/or printed onto the anode. Alternatively, in some embodiments, the selectively permeable membrane, e.g., in the shape of a film, can be extruded, spread, laminated, rolled, and/or printed onto a second selectively permeable membrane disposed onto the cathode. Whereas step 23 includes disposing the selectively permeable membrane onto the sealing material positioned on the anode, step 23 can alternatively or additionally include disposing the selectively permeable membrane onto the sealing material positioned on the cathode.

In some embodiments, the method 20 includes applying heat and/or pressure to form a seal between selectively permeable membrane and anode current collector in step 24. In this manner, the heat and/or pressure activates the sealing material to form the seal between selectively permeable membrane and anode current collector. In some embodiments, the heat and/or pressure melts a heat-activated sealing material. In some embodiments, pressure adheres a pressure sensitive sealing material. In some embodiments, the heat and/or pressure cures a sealing material.

Whereas step 24 includes applying heat and/or pressure to form a seal between selectively permeable membrane and anode current collector, step 24 can alternatively or additionally include applying heat and/or pressure to form a seal between selectively permeable membrane and cathode current collector.

In some embodiments, the method 20 includes disposing the cathode including cathode material and cathode current collector onto the anode with the selectively permeable membrane therebetween to form an electrochemical cell in step 25. In some embodiments, the selectively permeable membrane can include a surface coating on a surface of the cathode and/or the anode. In some embodiments, the selectively permeable membrane can include the functionalization of a surface of a cathode and/or the anode. Whereas step 25 includes disposing the cathode including cathode material and cathode current collector onto the anode with the selectively permeable membrane therebetween, step 25 can alternatively or additionally include disposing the anode including anode material and anode current collector onto the cathode with the selectively permeable membrane therebetween.

In some embodiments, the method 20 optionally includes disposing the electrochemical cell into a pouch in step 26. In some embodiments, the electrochemical cell can be enclosed in pouch material to form a single pouch battery cell. As used herein, the term "single pouch battery cell" refers to a battery cell (also referred to herein as "electrochemical cell") including a pouch typically containing one unit cell assembly, which further includes one anode, one cathode, and optionally, one separator. In some embodiments, one anode, one cathode, and one selectively permeable membrane can be stacked together to form a unit cell assembly, at least one of the anode and the cathode optionally including a semi-solid electrode material. In some embodiments, each unit cell assembly also includes conductive tabs (also referred to as a lead) to couple the electrodes to external circuits.

In some embodiments, pouch materials can include laminates (e.g., multi-layer sheets), formed into, for example, two or three solid film-like layers and bound together by adhesive. The word "laminate" as used herein can also refer to layers of material that are not chemically adhered to one another. For example, the layers can be in areal contact with each other and coupled using other coupling methods, such as, for example, heat sealing. In some embodiments, the pouch can formed from polypropylene, for example, cast propylene.

In some embodiments, the method 20 optionally includes sealing the pouch to form the finished electrochemical cell in step 27. In some embodiments, multiple unit cell assemblies can then be stacked or arrayed together to form a battery cell. In some embodiments, the number of unit cell assemblies in a battery cell can vary depending on, for example, the desired capacity and/or thickness of the resulting battery cell. In some embodiments, these stacked unit cell assemblies are electrically in parallel, and respective tabs in each unit cell assembly can be welded together via welding processes such as resistance welding, laser welding, and ultrasonic welding, seam welding, electric beam welding, among others. In some embodiments, optional step 27 can include a vacuum pouch sealing step to form a battery cell. During vacuum pouch sealing, an electrolyte is typically injected into the stacked unit cell assembly and the unit cell assemblies and the electrolyte are sealed into the pouch.

Figure 10:
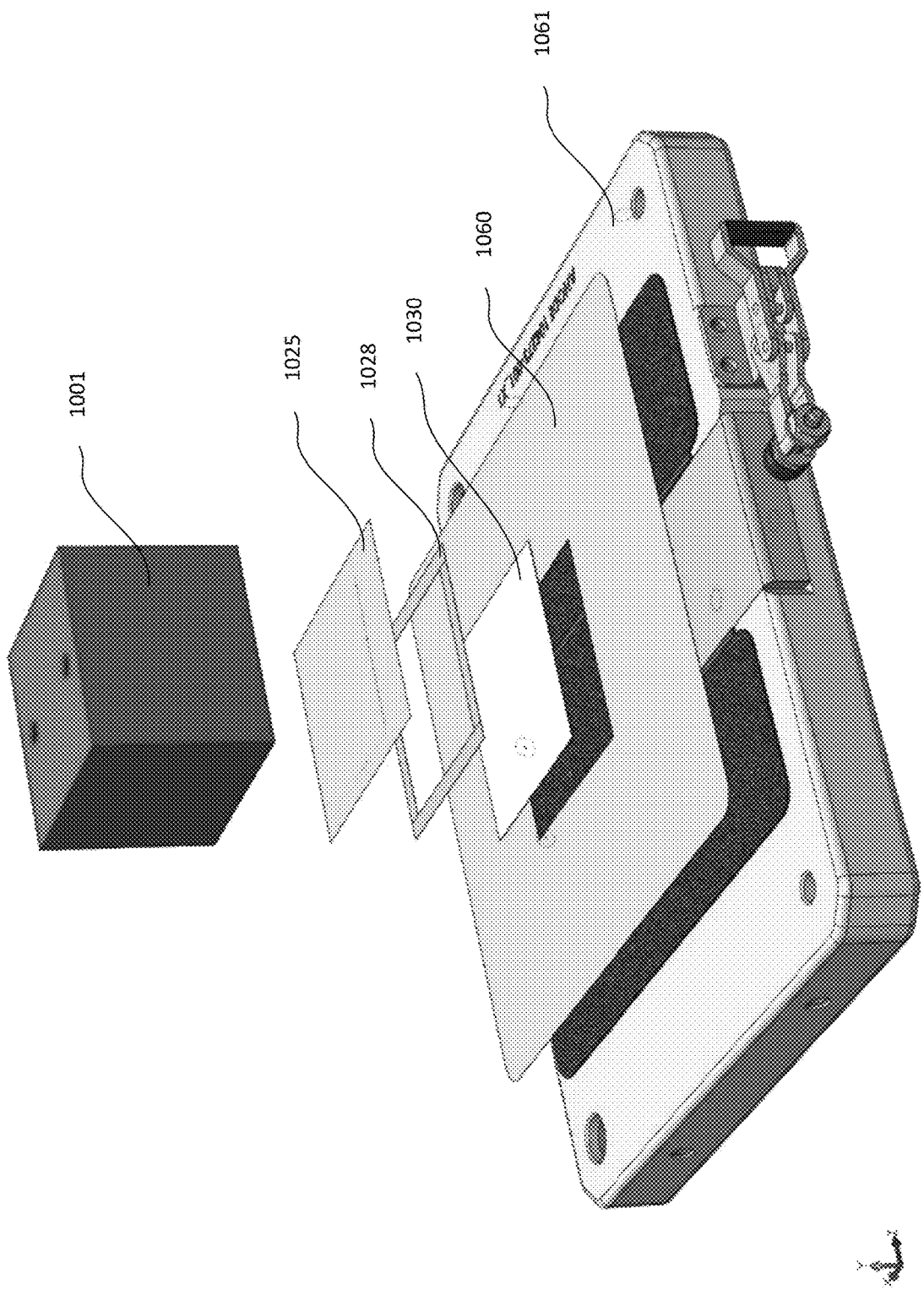
FIG. 10 illustrates an exploded view and fixture for sealing an electrode, according to an embodiment.

FIG. 10 illustrates an exploded view and fixture 1061 for sealing an electrode, according to an embodiment. In some embodiments, the fixture 1061 is an anode spreading pallet that is used to secure the selectively permeable membrane 1030. In some embodiments, the fixture 1061 is a vacuum chuck that secures the selectively permeable membrane 1030 in position with a vacuum.

In some embodiments, a paper mask 1060 is disposed on the fixture 1061 and surrounds the selectively permeable membrane 1030. The paper mask 1060 can help seal vacuum leaks from unused portions of the fixture 1061 when the fixture 1061 is a vacuum chuck, and can help prevent any excess sealing material 1028 from sticking to the fixture 1061.

A sealing material 1028 is disposed on the selectively permeable membrane 1030 and can be aligned with the perimeter of the selectively permeable membrane 1030. In some embodiments, the sealing material 1028 is a hot melt adhesive film.

A current collector 1025 can be disposed on the sealing material 1028. In some embodiments, the current collector 1025 has an electrode material disposed on a side of the current collector 1025 prior to being disposed on the sealing material 1028. The electrode material disposed on a side of the current collector 1025 is surrounded by the sealing material 1028 and contacts the selectively permeable membrane 1030 when the current collector 1025 is disposed on the sealing material 1028.

In some embodiments, the current collector 1025 is an anode current collector and the electrode material is an anode material. In some embodiments, the anode material is a conventional anode. In some embodiments, the anode material is a semi-solid anode. In some embodiments, the current collector 1025 is an cathode current collector and the electrode material is a cathode material. In some embodiments, the cathode material is a semi-solid cathode. In some embodiments, the cathode material is a conventional cathode.

A sealing tool 1001 contacts the current collector 1025 and seals the current collector 1025 to the selectively permeable membrane 1030 with the electrode material being disposed therebetween. In some embodiments, sealing tool 1001 is a heat sealing tool. In some embodiments, sealing tool 1001 is a solid machined block with a thermal mass that retains heat during a sealing step. The sealing tool 1001 is configured to apply heat and/or pressure to a side of the current collector 1025 that is opposite the electrode material. In some embodiments, sealing tool 1001 melts a hot melt adhesive sealing member 1028 to seal the current collector 1025 to the selectively permeable membrane 1030.

In some embodiments, sealing tool 1001 forms seal having a width of about 0.5 mm, about 1.0 mm, about 2.0 mm, about 3.0 mm, about 4.0 mm, about 5.0 mm, about 6.0 mm, about 7.0 mm, about 8.0 mm, about 9.0 mm, about 10.0 mm, about 11.0 mm, about 12.0 mm, 13.0 mm, about 14.0 mm, about 15.0 mm, about 16.0 mm, about 17.0 mm, about 18.0 mm, about 19.0 mm, about 20.0 mm, about 21.0 mm, about 22.0 mm, about 23.0 mm, about 24.0 mm, 25.0 mm, about 26.0 mm, about 27.0 mm, about 28.0 mm, about 29.0 mm, or about 30.0 mm, including all sealing widths therebetween. In some embodiments, sealing tool 1001 forms continuous seal from a sealing material 1028 that is one piece or two or more pieces.

Figure 11B:
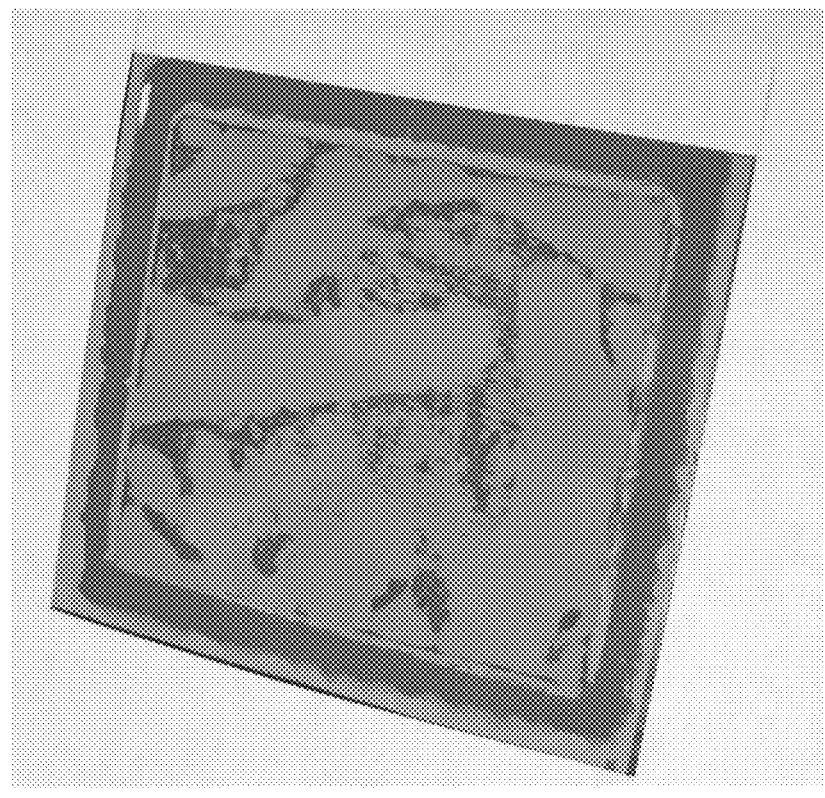
FIG. 11B illustrates a topside view of a sealed electrode, according to an embodiment.
Figure 11A:
FIG. 11A illustrates a backside view of a sealed electrode, according to an embodiment.

FIG. 11A illustrates a backside view of a sealed electrode 1100a, according to an embodiment. In this embodiment, the backside of a sealed anode is shown with the anode current collector facing upwards. FIG. 11B illustrates a topside view of a sealed electrode 1100b, according to an embodiment. In this embodiment, the topside of a sealed anode is shown with the selectively permeable membrane facing upwards. The selectively permeable membrane used was 20 microns thick and comprises a ceramic substrate.

Working Example 1

Figure 12:
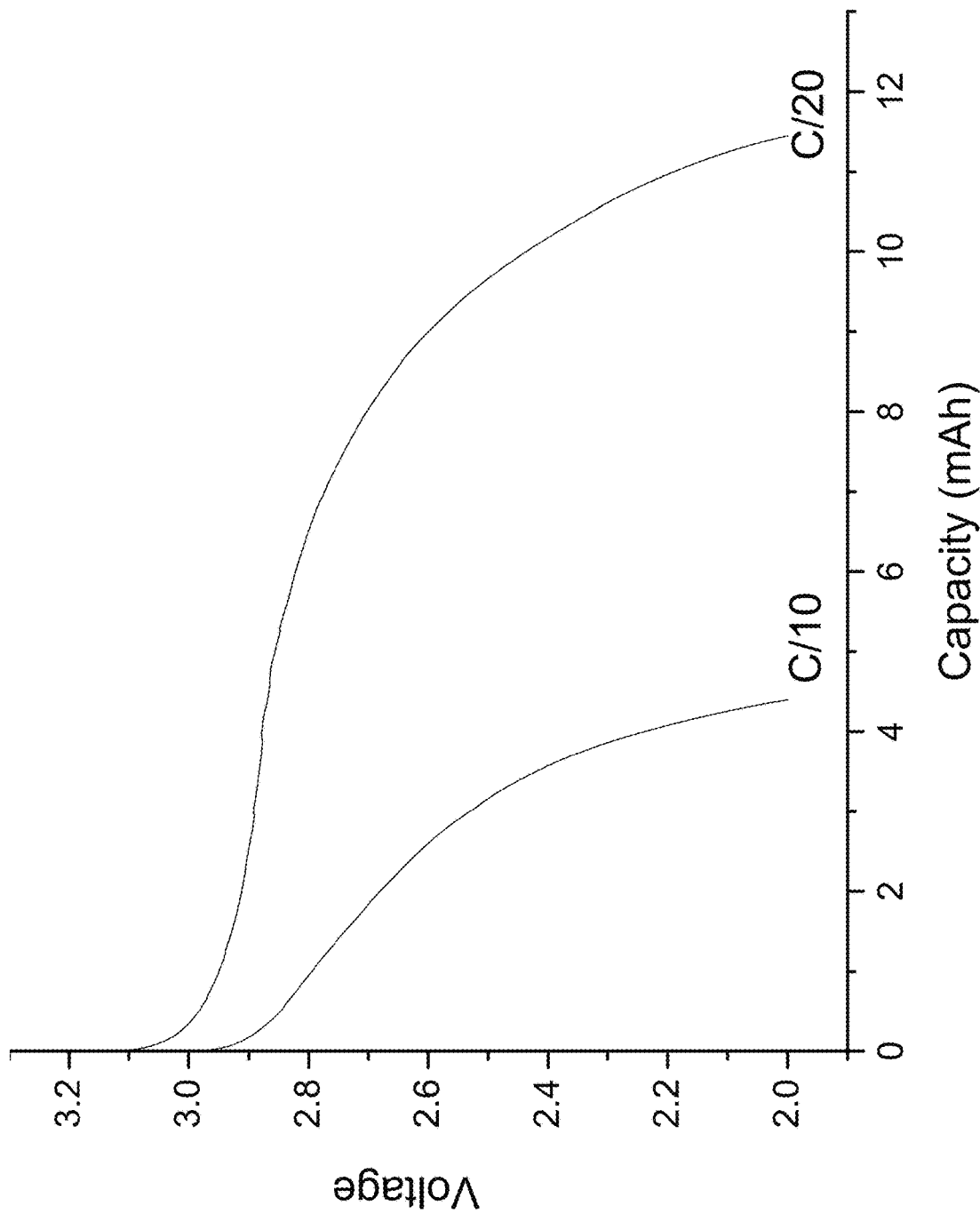
FIG. 12 is a discharge graph showing voltage and capacity change during discharge for an electrochemical cell.

FIG. 12 is a discharge graph showing voltage and capacity change during discharge for an electrochemical cell. The electrochemical cell includes a semi-solid lithium iron phosphate cathode including a carbon conductive additive and electrolyte A at a ratio of 45:1:54 and a semi-solid graphene-containing anode including a carbon conductive additive and electrolyte B at a ratio of 50:2:48. Electrolyte A is an electrolyte that is electrochemically tailored for the chemistry of the cathode while electrolyte B is an electrolyte that is electrochemically tailored for the chemistry of the anode, without regard for the compatibility of electrolyte A with the anode and electrolyte B with the cathode. Electrolyte A is 4 M LiFSI in DME and Electrolyte B is 1 M LiPF$_6$ in EC:PC:DMC:EMC+2% VC. The electrochemical cell includes a selectively permeable membrane comprising Li$_{1+x+y}$Al$_x$(Ti,Ge)$_{2-x}$Si$_y$P$_{3-y}$O$_{12}$ and being 180 microns thick.

The electrochemical cell has a cathode area capacity of 13 mAh with an active area of 10 cm$^2$ and an anode capacity to cathode capacity ratio (A:C ratio) of 1.2. When the electrochemical cell is discharged at a C-rate of C/10, the voltage drops from about 3 V to about 2.0 V while the capacity increases from about 0 mAh to about 4.5 mAh. When the electrochemical cell is discharged at a C-rate of C/20, the voltage drops from about 3.1 V to about 2.0 V while the capacity increases from about 0 mAh to about 11.5 mAh. The electrochemical cell of this first working example experiences only about a 40% loss of capacity due to side reactions.

Working Example 2

Figure 13:
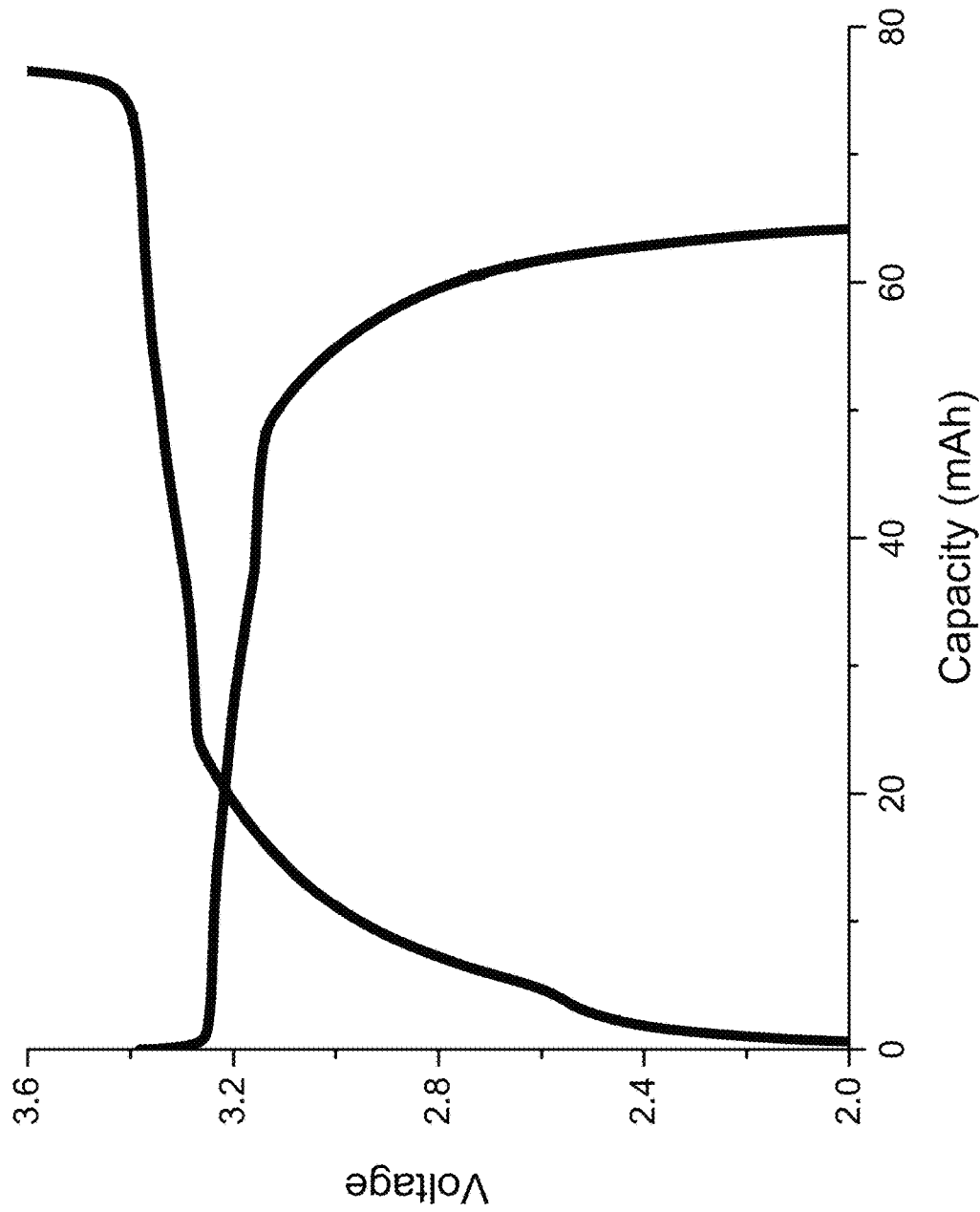
FIG. 13 is a charge-discharge graph showing voltage and capacity change during charge and discharge for an electrochemical cell.

FIG. 13 is a charge-discharge graph showing voltage and capacity change during charge and discharge for an electrochemical cell. The electrochemical cell includes a semi-solid lithium iron phosphate cathode including a carbon conductive additive and electrolyte A at a ratio of 45:1:54 and a semi-solid graphene-containing anode including a carbon conductive additive and electrolyte B at a ratio of 50:2:48. Electrolyte A is an electrolyte that is electrochemically tailored for the chemistry of the cathode while electrolyte B is an electrolyte that is electrochemically tailored for the chemistry of the anode, without regard for the compatibility of electrolyte A with the anode and electrolyte B with the cathode. Electrolyte A is paired with the anode and electrolyte B is paired with the cathode. Electrolyte A is 4 M LiFSI in DME and Electrolyte B is 1 M LiPF$_6$ in EC:PC:DMC:EMC+2% VC. The electrochemical cell includes a selectively permeable membrane comprising $Li_{1+x+y}Al_x(Ti,Ge)_{2-x}Si_yP_{3-y}O_{12}$ and being 40 microns thick. The electrochemical cell also includes a polymer separator on the anode side. Compared to the electrochemical cell in the first working example, the electrochemical cell described here includes a thicker cathode and a thicker anode, increasing the theoretical capacity.

The electrochemical cell has a cathode area capacity of 6.8 mAh/cm$^2$ and an anode capacity to cathode capacity ratio (A:C ratio) of 1.2. When the electrochemical cell is initially charged at a C-rate of C/20, the voltage increases from about 0 V to about 3.6 V while the capacity decreases from about 8 mAh/cm$^2$ to about 0 mAh/cm$^2$. When the electrochemical cell is discharged at a C-rate of C/10, the voltage drops from about 3.4 V to about 2.0 V while the capacity increases from about 0 mAh/cm$^2$ to about 6.5 mAh/cm$^2$. The electrochemical cell of this second working example achieved 85% of design efficiency. The cell did not observe side reactions other than the formation of a solid electrolyte interface layer on the graphite anode.

Working Example 3

Figure 14:
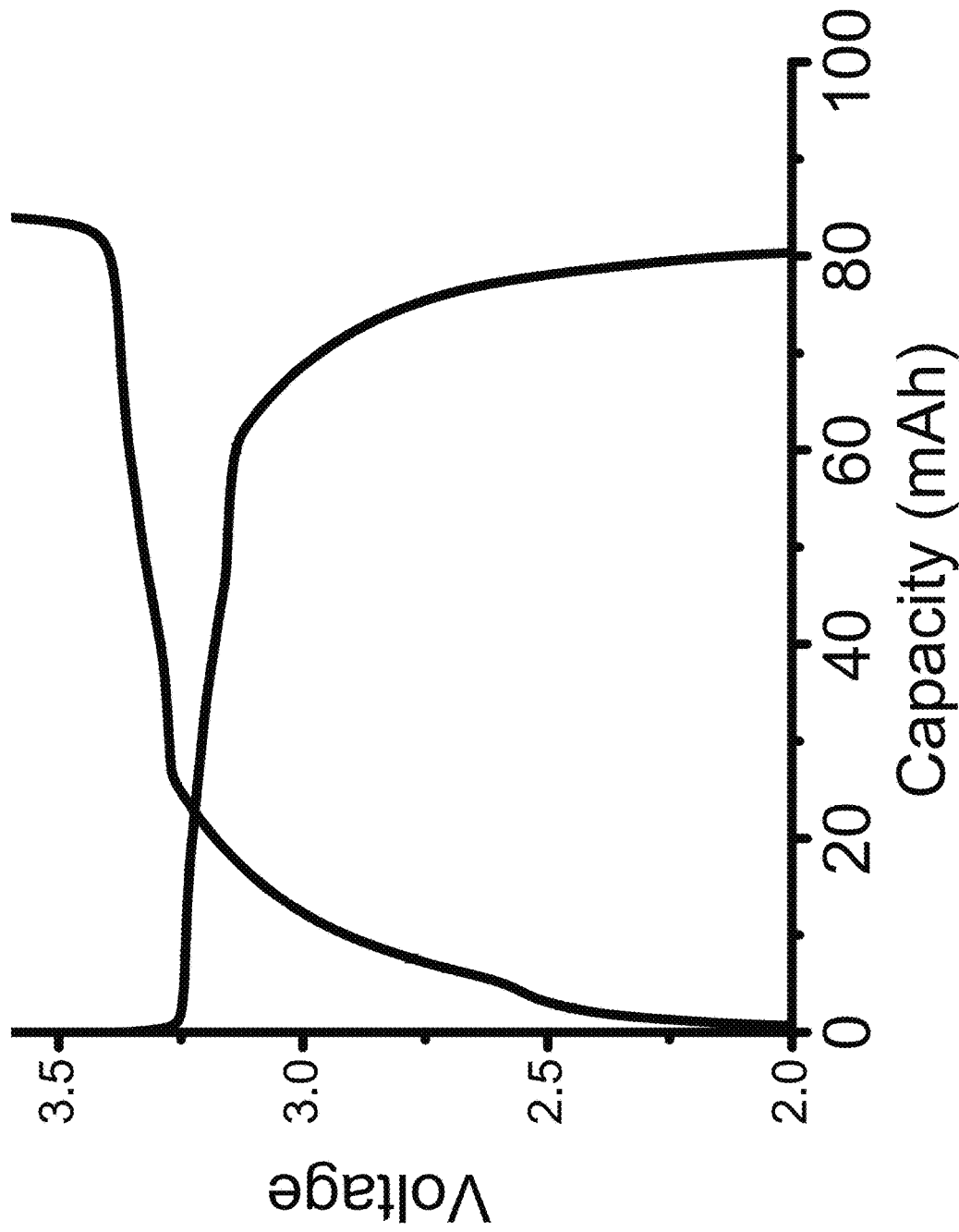
FIG. 14 is a charge-discharge graph showing voltage and capacity change during charge and discharge for an electrochemical cell.

FIG. 14 is a charge-discharge graph showing voltage and capacity change during charge and discharge for an electrochemical cell. The electrochemical cell includes a semi-solid lithium iron phosphate cathode including a carbon conductive additive and electrolyte A at a ratio of 45:1:54 and a semi-solid graphene-containing anode including a carbon conductive additive and electrolyte B at a ratio of 50:2:48. Electrolyte A is an electrolyte that is electrochemically tailored for the chemistry of the cathode while electrolyte B is an electrolyte that is electrochemically tailored for the chemistry of the anode, without regard for the compatibility of electrolyte A with the anode and electrolyte B with the cathode. A with the anode and electrolyte B with the cathode. Electrolyte A is 4 M LiFSI in DME and Electrolyte B is 1 M LiFSI in EC:GBL+2% VC+0.5% TOP. The electrochemical cell includes a selectively permeable membrane comprising $Li_{1+x+y}Al_x(Ti,Ge)_{2-x}Si_yP_{3-y}O_{12}$ and being 45 microns thick. The electrochemical cell also includes a polymer separator on the anode side. Compared to the electrochemical cell in the first working example, the electrochemical cell described here includes a thicker cathode and a thicker anode, increasing the theoretical capacity.

The electrochemical cell has a cathode area capacity of 8 mAh/cm$^2$ and an anode capacity to cathode capacity ratio (A:C ratio) of 1.2. When the electrochemical cell is initially charged at a C-rate of C/20, the voltage increases from about 0 V to about 3.6 V while the capacity decreases from about 9 mAh/cm$^2$ to about 0 mAh/cm$^2$. When the electrochemical cell is discharged at a C-rate of C/10, the voltage drops from about 3.4 V to about 2.0 V while the capacity increases from about 0 mAh/cm$^2$ to about 8 mAh/cm$^2$. The electrochemical cell of this second working example achieved 85% of design efficiency. The cell did not observe side reactions other than the formation of a solid electrolyte interface layer on the graphite anode.

Working Example 4

Figure 15:
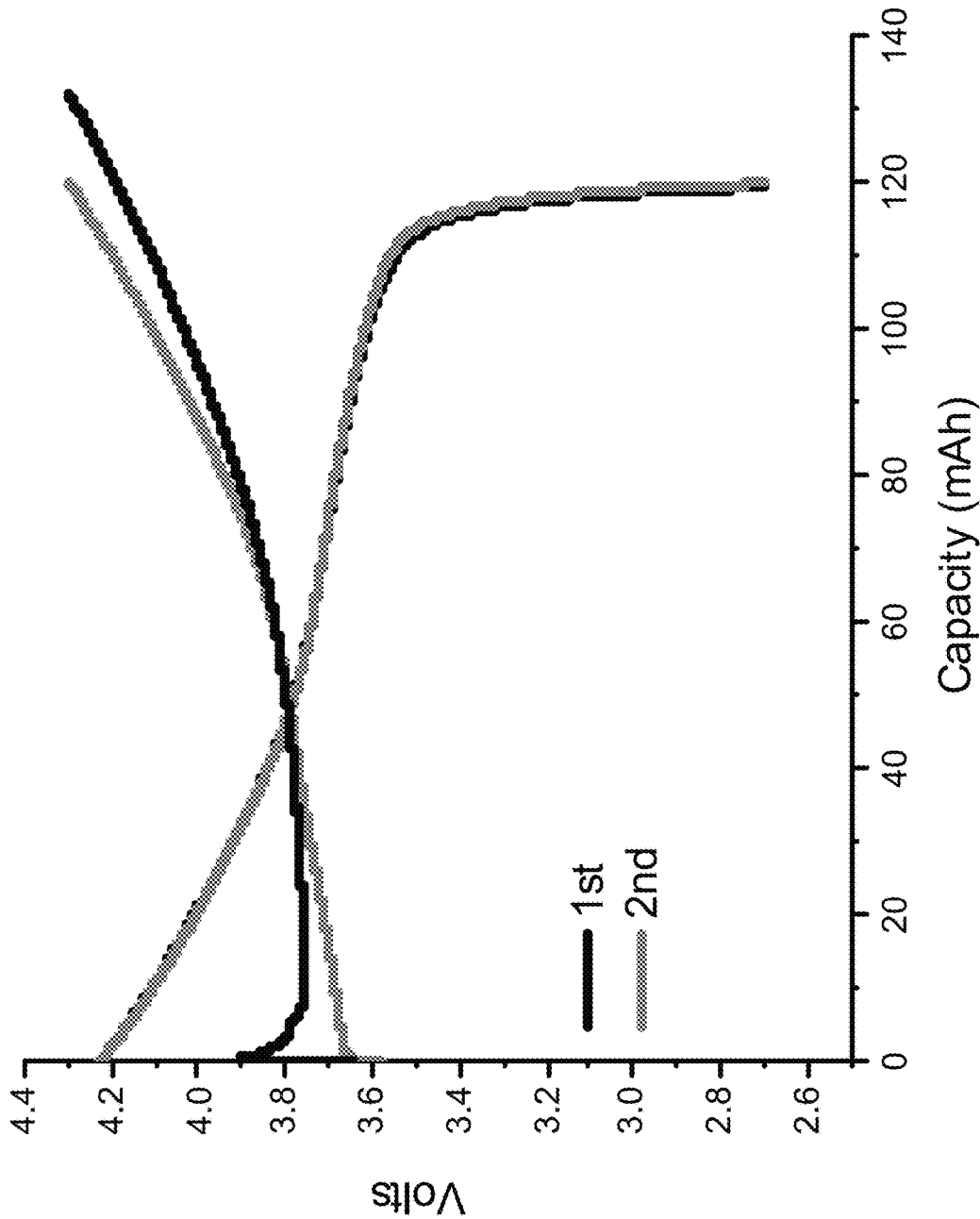
FIG. 15 is a charge-discharge graph showing voltage and capacity change during charge and discharge for an electrochemical cell.

FIG. 15 is a charge-discharge graph showing voltage and capacity change during charge and discharge for an electrochemical cell. The electrochemical cell includes a 160 μm thick semi-solid cathode and a 100 μm conventional lithium anode in areal capacity ratio of negative to positive electrode (N/P ratio) of 2.67. The designed areal capacity is 2.5 mAh/cm$^2$. The energy density is 929 Wh/L and the specific energy is 356 Wh/kg without the solid-state electrolyte material. With the solid-state electrolyte material, the specific energy is 249 Wh/kg. Constant current charging/constant current discharging (CC/DC) cycling is at 0.2mAh/cm$^2$ from 4.3 volts to 2.7 volts and the coulombic efficiency (CE) is ~99.56%.

While some examples provided herein refer to lithium ions and lithium-containing electrodes, one of skill in the art will understand that many chemistries are possible for the electrodes and electrochemical cells described herein, including but not limited to sodium-ion and magnesium-ion.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments described herein.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

The invention claimed is:
1. A method of forming an electrochemical cell, comprising:
    dispensing a semi-solid cathode slurry onto a cathode current collector to form a cathode;
    dispensing a first anode material onto an anode current collector to form an anode;
    extruding a solid-state electrolyte powder and a polymeric powder binder to form a selectively permeable membrane;

disposing a first surface of the selectively permeable membrane onto the cathode or the anode, the selectively permeable membrane configured to chemically and/or fluidically isolate the cathode including a catholyte from the anode including an anolyte, the selectively permeable membrane not providing electrical isolation between the anode and the cathode;

disposing a conventional separator on a second surface of the selectively permeable membrane, the second surface opposite to the first surface, the conventional separator configured to provide electrical isolation between the anode and the cathode and to allow for ionic charge carriers to be transferred between the cathode and the anode, the selectively permeable membrane including a second active material configured to fill pores of the conventional separator; and disposing the selectively permeable membrane with the conventional separator between the cathode and the anode to form the electrochemical cell, wherein the second active material is a second anode active material such that the second active material becomes a second anode of the electrochemical cell, or the second active material is a cathode active material such that the second active material becomes a second cathode of the electrochemical cell.

2. The method of claim 1, further comprising:
disposing a $Li_2CoO_3$ layer between the selectively permeable membrane and the cathode.

3. The method of claim 1, wherein the selectively permeable membrane includes a diffusion preventing material applied to one or both sides of the selectively permeable membrane.

4. The method of claim 1, further comprising:
disposing a lithium metal layer between the anode current collector and the first anode material.

5. The method of claim 1, further comprising:
disposing a metal oxide between the selectively permeable membrane and the first anode material.

6. The method of claim 1, further comprising:
disposing a first film layer between the cathode and the selectively permeable membrane.

7. The method of claim 1, wherein the polymeric powder binder includes at least one of polyvinylidene difluoride (PVDF), a fluorinated polymer, polyethylene terephthalate (PET), poly phenylene sulfide (PPS), polyvinyl chloride (PVC), styrene butadiene rubber (SBR), polyethylene oxide (PEO), cellulose, or polyacrylate.

8. The method of claim 1, further comprising:
disposing a layer including self-terminated oligomers with hyperbranched architecture between the selectively permeable membrane and at least one of the first anode material or the cathode.

9. The method of claim 1, wherein the solid-state electrolyte powder includes at least one of a garnet structure, a perovskite structure, a phosphate-based Lithium Super Ionic Conductor (LISICON) structure, $La_{0.51}Li_{0.34}TiO_{2.94}$, $Li_{1.3}Al_{0.3}Ti_{1.7}(PO_4)_3$, $Li_7La_3Zr_2O_{12}$, $Li_{6.66}La_3Zr_{1.6}Ta_{0.4}O_{12.9}$ (LLZO), $50Li_4SiO_4·50Li_3BO_3$, $Li_{2.9}PO_{3.3}N_{0.46}$ (lithium phosphorousoxynitride, LiPON), $Li_{3.6}S_{10.6}P_{0.4}O_4$, $Li_3BN_2$, $Li_3BO_3$—$Li_2SO_4$, $Li_3BO_3$—$Li_2SO_4$—$Li_2CO_3$ (LIBSCO, pseudoternary system), sulfide contained solid electrolyte materials, a thio-LISICON structure, a glassy structure, a glass-ceramic structure, $Li_{1.07}Al_{0.69}Ti_{1.46}(PO_4)_3$, $Li_{1.5}Al_{0.5}Ge_{1.5}(PO_4)_3$, $Li_{10}GeP_2Si_2$ (LGPS), $30Li_2S·26B_2S_3·44LiI$, $63Li_2S·36SiS_2·1Li_3PO_4$, $57Li_2S·38SiS_2·5Li_4SiO_4$, $70Li_2S·30P_2S_5$, $50Li_2S·50GeS_2$, $Li_7P_3S_{11}$, $Li_{3.25}P_{0.95}S_4$, $Li_{9.54}Si_{1.74}P_{1.44}S_{11.7}Cl_{0.3}$, a closo-type complex hydride solid electrolyte, $LiBH_4$—LiI, $LiBH_4$—$LiNH_2$, $LiBH_4$—$P_2S_5$, $Li(CB_9H_{10})$—LiI, a lithium electrolyte salt, bis(trifluoromethane)sulfonamide (TFSI), bis(pentalluoroethanesulfonyl)imide (BETI), bis(fluorosulfonyl)imide, lithium borate oxalato phosphine oxide (LiBOP), lithium bis(fluorosulfonyl)imide, amide-borohydride, $LiBF_4$, or $LiPF_6$.

10. A method of forming an electrochemical cell, comprising:
dispensing a semi-solid cathode slurry onto a cathode current collector to form a cathode;

dispensing a first anode material onto an anode current collector to form an anode;

processing at least one of a solid-state electrolyte material or a first active material with a binder to form a selectively permeable membrane, the processing including at least one of extruding or blowing;

disposing a first surface of the selectively permeable membrane onto the cathode or the anode, the selectively permeable membrane configured to chemically and/or fluidically isolate the cathode including a catholyte from the anode including an anolyte, the selectively permeable membrane not providing electrical isolation between the anode and the cathode;

disposing a conventional separator on a second surface of the selectively permeable membrane, the second surface opposite to the first surface, the conventional separator configured to provide electrical isolation between the anode and the cathode and to allow for ionic charge carriers to be transferred between the cathode and the anode, the selectively permeable membrane including a second active material configured to fill pores of the conventional separator; and disposing the selectively permeable membrane with the conventional separator between the cathode and the anode to form the electrochemical cell, wherein the second active material is a second anode active material such that the second active material becomes a second anode of the electrochemical cell, or the second active material is a cathode active material such that the second active material becomes a second cathode of the electrochemical cell.

11. The method of claim 10, wherein the selectively permeable membrane includes a diffusion preventing material applied to one or both sides of the selectively permeable membrane.

12. The method of claim 10, further comprising:
disposing a lithium metal layer between the anode current collector and the first anode material.

13. The method of claim 10, further comprising:
disposing a first film layer between the cathode and the selectively permeable membrane.

14. The method of claim 10, further comprising:
disposing a layer including self-terminated oligomers with hyperbranched architecture between the selectively permeable membrane and at least one of the first anode material or the cathode.

15. The method of claim 10, wherein the solid-state electrolyte material is selected from at least one of a garnet structure, a perovskite structure, a phosphate-based Lithium Super Ionic Conductor (LISICON) structure, $La_{0.51}Li_{0.34}TiO_{2.94}$, $Li_{1.3}Al_{0.3}Ti_{1.7}(PO_4)_3$, $Li_7La_3Zr_2O_{12}$, $Li_{6.66}La_3Zr_{1.6}Ta_{0.4}O_{12.9}$ (LLZO), $50Li_4SiO_4·50Li_3BO_3$, $Li_{2.9}PO_{3.3}N_{0.46}$ (lithium phosphorousoxynitride, LiPON), $Li_{3.6}S_{10.6}P_{0.4}O_4$, $Li_3BN_2$, $Li_3BO_3$—$Li_2SO_4$, $Li_3BO_3$—$Li_2SO_4$—$Li_2CO_3$ (LIBSCO, pseudoternary system), sulfide contained solid electrolyte materials, a thio-LISICON structure, a glassy structure, a glass-ceramic structure, $Li_{1.07}Al_{0.69}Ti_{1.46}(PO_4)_3$, $Li_{1.5}Al_{0.5}Ge_{1.5}(PO_4)_3$, $Li_{10}GeP_2Si_2$ (LGPS), $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_7P_3S_{11}$, $Li_{3.25}P_{0.95}S_4$, $Li_{9.54}S_{11.74}P_{1.44}S_{11.7}Cl_{0.3}$, a closo-type complex hydride solid electrolyte, $LiBH_4$—$LiI$, $LiBH_4$—$LiNH_2$, $LiBH_4$—$P_2S_5$, $Li(CB_9H_{10})$—$LiI$, a lithium electrolyte salt, bis(trifluoromethane)sulfonamide (TFSI), bis(pentalluoroethanesulfonyl)imide (BETI), bis(fluorosulfonyl)imide, lithium borate oxalato phosphine oxide (LiBOP), lithium bis(fluorosulfonyl)imide, amide-borohydride, $LiBF_4$, or $LiPF_6$.

16. The method of claim 10, further comprising:
disposing a $Li_2CoO_3$ layer between the selectively permeable membrane and the cathode.

17. The method of claim 16, further comprising:
disposing a metal oxide between the selectively permeable membrane and the first anode material.

18. The method of claim 10, further comprising:
disposing the electrochemical cell into a pouch; and sealing the pouch to form the electrochemical cell.

19. The method of claim 18, wherein the selectively permeable membrane extends substantially beyond the anode and the cathode and is sealed between a first portion of the pouch and a second portion of the pouch.

20. A method of forming an electrochemical cell, comprising:
dispensing a semi-solid cathode slurry onto a cathode current collector to form a cathode;
dispensing a first anode material onto an anode current collector to form an anode;
coating a solid-state electrolyte powder with a polymeric binder to form a selectively permeable membrane, the coating via at least one of extrusion with a hot/cold press process or extrusion process without a hot/cold press process;
disposing a first surface of the selectively permeable membrane onto the cathode or the anode, the selectively permeable membrane configured to chemically and/or fluidically isolate the cathode including a catholyte from the anode including an anolyte, the selectively permeable membrane not providing electrical isolation between the anode and the cathode;
disposing a conventional separator on a second surface of the selectively permeable membrane, the second surface opposite to the first surface, the conventional separator configured to provide electrical isolation between the anode and the cathode and to allow for ionic charge carriers to be transferred between the cathode and the anode, the selectively permeable membrane including a second active material configured to fill pores of the conventional separator; and
disposing the selectively permeable membrane with the conventional separator between the cathode and the anode to form the electrochemical cell,
wherein the second active material is a second anode active material such that the second active material becomes a second anode of the electrochemical cell, or the second active material is a cathode active material such that the second active material becomes a second cathode of the electrochemical cell.

21. The method of claim 20, further comprising:
disposing a $Li_2CoO_3$ layer between the selectively permeable membrane and the cathode.

22. The method of claim 20, wherein the selectively permeable membrane includes a diffusion preventing material applied to one or both sides of the selectively permeable membrane.

23. The method of claim 20, further comprising:
disposing a lithium metal layer between the anode current collector and the first anode material.

24. The method of claim 20, further comprising:
disposing a metal oxide between the selectively permeable membrane and the first anode material.

25. The method of claim 20, further comprising:
disposing a first film layer between the cathode and the selectively permeable membrane.

26. The method of claim 20, wherein the polymeric binder includes at least one of polyvinylidene difluoride (PVDF), a fluorinated polymer, polyethylene terephthalate (PET), poly phenylene sulfide (PPS), polyvinyl chloride (PVC), styrene butadiene rubber (SBR), polyethylene oxide (PEO), cellulose, or polyacrylate.

27. The method of claim 20, further comprising:
disposing a layer including self-terminated oligomers with hyperbranched architecture between the selectively permeable membrane and at least one of the first anode material or the cathode.

28. The method of claim 20, wherein the solid-state electrolyte powder includes at least one of a garnet structure, a perovskite structure, a phosphate-based Lithium Super Ionic Conductor (LISICON) structure, $La_{0.51}Li_{0.34}TiO_{2.94}$, $Li_{1.3}Al_{0.3}Ti_{1.7}(PO_4)_3$, $Li_7La_3Zr_2O_{12}$, $Li_{6.66}La_3Zr_{1.6}Ta_{0.4}O_{12.9}$ (LLZO), $50Li_4SiO_4 \cdot 50Li_3BO_3$, $Li_{2.9}PO_{3.3}N_{0.46}$ (lithium phosphorousoxynitride, LiPON), $Li_{3.6}S_{10.6}P_{0.4}O_4$, $Li_3BN_2$, $Li_3BO_3$—$Li_2SO_4$, $Li_3BO_3$—$Li_2SO_4$—$Li_2CO_3$ (LIBSCO, pseudoternary system), sulfide contained solid electrolyte materials, a thio-LISICON structure, a glassy structure, a glass-ceramic structure, $Li_{1.07}Al_{0.69}Ti_{1.46}(PO_4)_3$, $Li_{1.5}Al_{0.5}Ge_{1.5}(PO_4)_3$, $Li_{10}GeP_2Si_2$ (LGPS), $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_7P_3S_{11}$, $Li_{3.25}P_{0.95}S_4$, $Li_{9.54}Si_{1.74}P_{1.44}S_{11.7}Cl_{0.3}$, a closo-type complex hydride solid electrolyte, $LiBH_4$—$LiI$, $LiBH_4$—$LiNH_2$, $LiBH_4$—$P_2S_5$, $Li(CB_9H_{10})$—$LiI$, a lithium electrolyte salt, bis(trifluoromethane)sulfonamide (TFSI), bis(pentalluoroethanesulfonyl)imide (BETI), bis(fluorosulfonyl)imide, lithium borate oxalato phosphine oxide (LiBOP), lithium bis(fluorosulfonyl)imide, amide-borohydride, $LiBF_4$, or $LiPF_6$.

* * * * *